(12) United States Patent
Toyotaka et al.

(10) Patent No.: US 11,183,137 B2
(45) Date of Patent: Nov. 23, 2021

(54) OPERATION METHOD OF DISPLAY APPARATUS

(71) Applicant: Semiconductor Energy Laboratory Co., Ltd., Kanagawa-ken (JP)

(72) Inventors: Kouhei Toyotaka, Kanagawa (JP); Kazunori Watanabe, Tokyo (JP); Susumu Kawashima, Kanagawa (JP)

(73) Assignee: Semiconductor Energy Laboratory Co., Ltd.

( * ) Notice: Subject to any disclaimer, the term of this patent is extended or adjusted under 35 U.S.C. 154(b) by 0 days.

(21) Appl. No.: 16/970,779

(22) PCT Filed: Feb. 13, 2019

(86) PCT No.: PCT/IB2019/051134
§ 371 (c)(1),
(2) Date: Aug. 18, 2020

(87) PCT Pub. No.: WO2019/162801
PCT Pub. Date: Aug. 29, 2019

(65) Prior Publication Data
US 2021/0097951 A1    Apr. 1, 2021

(30) Foreign Application Priority Data
Feb. 23, 2018  (JP) .............................. JP2018-030259

(51) Int. Cl.
*G09G 3/36*    (2006.01)
(52) U.S. Cl.
CPC ......... *G09G 3/3688* (2013.01); *G09G 3/3607* (2013.01); *G09G 2300/0426* (2013.01)

(58) Field of Classification Search
CPC ............... G09G 3/3688; G09G 3/3607; G09G 2300/0426
See application file for complete search history.

(56) References Cited

U.S. PATENT DOCUMENTS 6,175,351 B1 * 1/2001 Matsuura ............. G09G 3/3614
345/98
7,928,945 B2    4/2011 Kimura et al.
(Continued)

FOREIGN PATENT DOCUMENTS

CN    102654979 A    9/2012
JP    07-092935 A    4/1995
(Continued)

OTHER PUBLICATIONS

International Search Report (Application No. PCT/IB2019/051134) dated May 21, 2019.
(Continued)

*Primary Examiner* — Kenneth B Lee, Jr.
(74) *Attorney, Agent, or Firm* — Husch Blackwell LLP

(57) ABSTRACT

A display apparatus that operates at high speed is provided. The display apparatus includes a display portion provided with a pixel, and the display portion has a function of displaying a first-color image and a second-color image. A first period in which first image data and first data are written to the pixel, a second period in which the first-color image corresponding to the first image data is displayed on the display portion, a third period in which second image data is generated in the pixel on the basis of the first image data and the first data, and a fourth period in which the second-color image corresponding to the second image data is displayed on the display portion are included.

11 Claims, 18 Drawing Sheets

(56) References Cited

U.S. PATENT DOCUMENTS

| | | | |
|---|---|---|---|
| 8,643,591 B2 | 2/2014 | Kimura et al. | |
| 8,976,090 B2 | 3/2015 | Yamamoto et al. | |
| 2004/0263440 A1 | 12/2004 | Kimura et al. | |
| 2011/0186852 A1 | 8/2011 | Kimura et al. | |
| 2012/0223978 A1 | 9/2012 | Yamamoto et al. | |
| 2020/0142229 A1 | 5/2020 | Kusunoki et al. | |
| 2020/0175905 A1 | 6/2020 | Yamazaki et al. | |
| 2020/0193928 A1 | 6/2020 | Kawashima et al. | |
| 2020/0258921 A1 | 8/2020 | Takahashi et al. | |
| 2020/0302889 A1 | 9/2020 | Takahashi et al. | |

FOREIGN PATENT DOCUMENTS

| | | | |
|---|---|---|---|
| JP | 11-084419 A | 3/1999 | |
| JP | 2000-259130 A | 9/2000 | |
| JP | 2003-216109 A | 7/2003 | |
| JP | 2004-341314 A | 12/2004 | |
| JP | 2009-156961 A | 7/2009 | |
| JP | 2012-003236 A | 1/2012 | |
| JP | 2012-141569 A | 7/2012 | |
| JP | 2012-185328 A | 9/2012 | |
| JP | 2013-003223 A | 1/2013 | |

OTHER PUBLICATIONS

Written Opinion (Application No. PCT/IB2019/051134) dated May 21, 2019.

* cited by examiner

FIG. 2

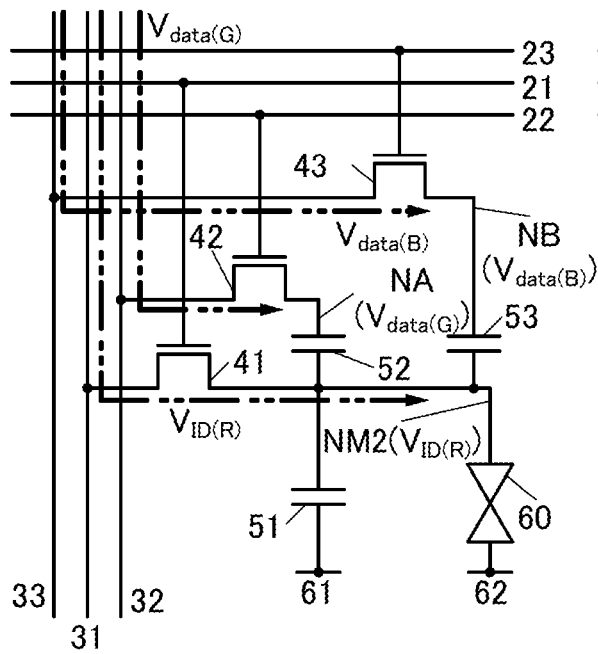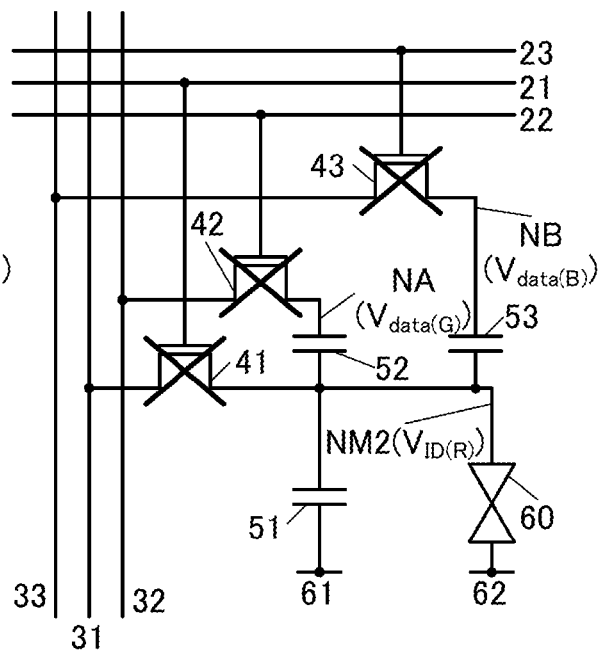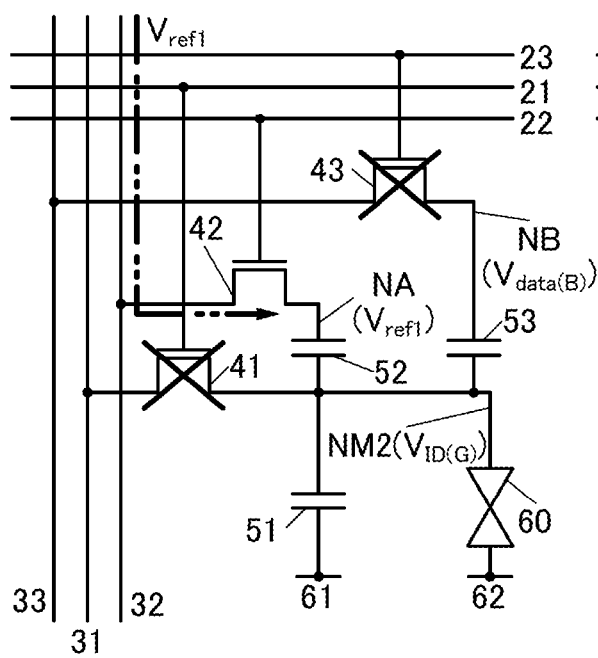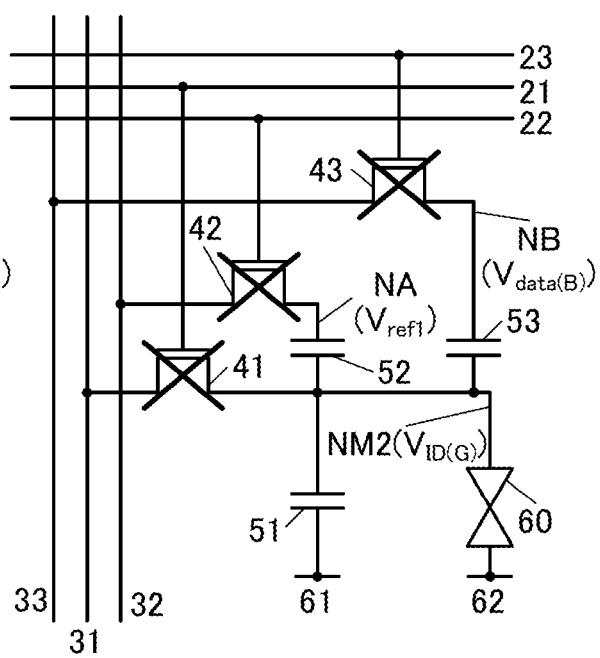

FIG. 17A
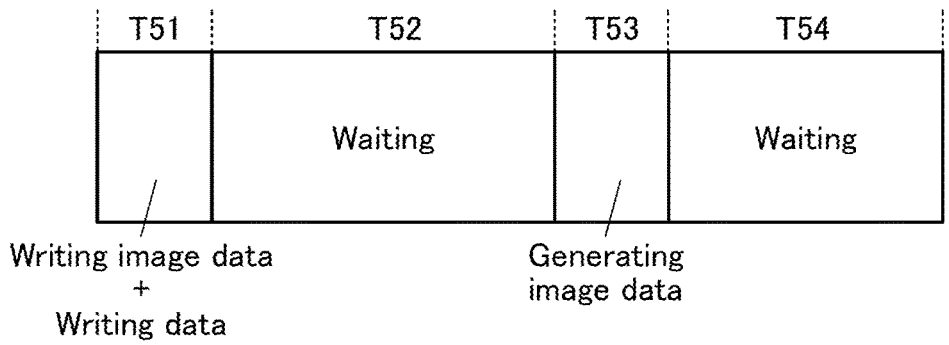
FIG. 17B1
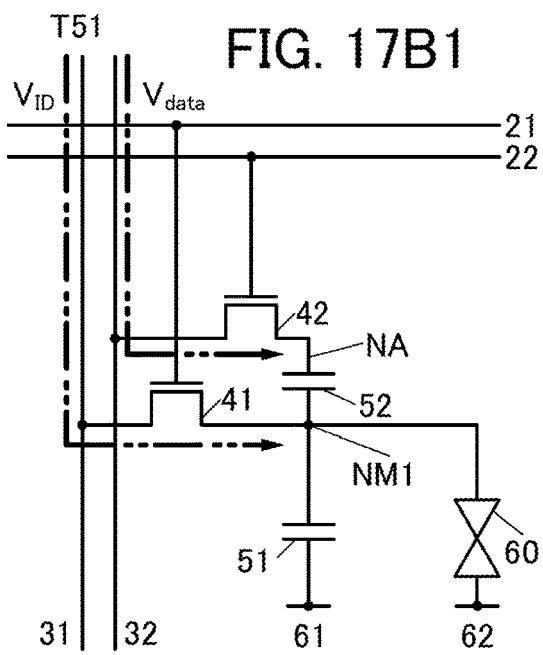
FIG. 17B2
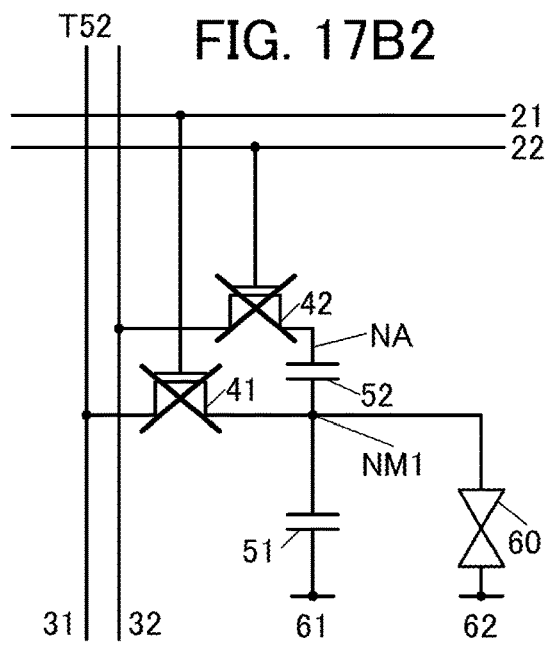
FIG. 17B3
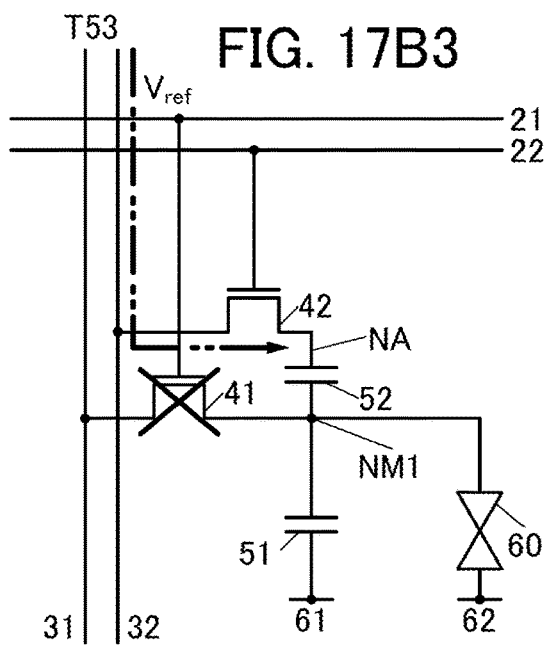
FIG. 17B4
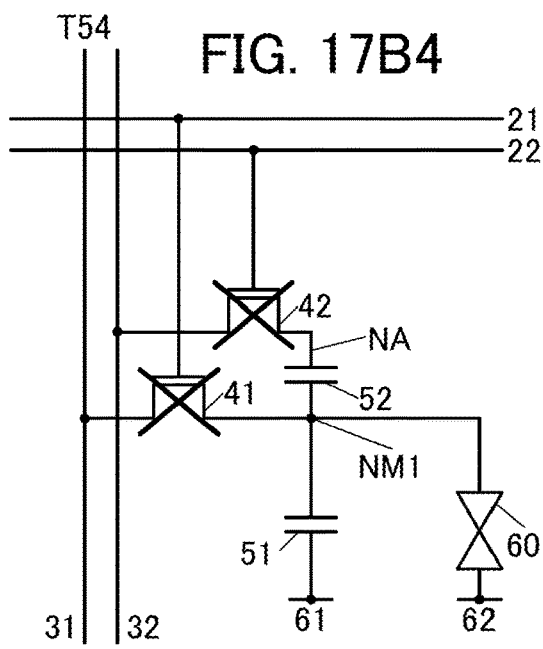

OPERATION METHOD OF DISPLAY APPARATUS

This application is a 371 of international application PCT/IB2019/051134 filed on Feb. 13, 2019 which is incorporated herein by reference.

TECHNICAL FIELD

One embodiment of the present invention relates to a display apparatus and an operation method thereof.

Note that one embodiment of the present invention is not limited to the above technical field. The technical field of one embodiment of the invention disclosed in this specification and the like relates to an object, a method, or a manufacturing method. Alternatively, one embodiment of the present invention relates to a process, a machine, manufacture, or a composition of matter. Specifically, examples of the technical field of one embodiment of the present invention disclosed in this specification include a semiconductor device, a display apparatus, a liquid crystal apparatus device, a light-emitting device, a lighting device, a power storage device, a memory device, an imaging device, a driving method thereof, and a manufacturing method thereof.

Note that in this specification and the like, a semiconductor device generally means a device that can function by utilizing semiconductor characteristics. A transistor and a semiconductor circuit are embodiments of semiconductor devices. In some cases, a memory device, a display apparatus, an imaging device, or an electronic device includes a semiconductor device.

BACKGROUND ART

A color filter method and a field-sequential method are known as display methods for display apparatuses including a liquid crystal device as a display device, for example. In a display apparatus that performs display by the former method, a plurality of subpixels which have color filters for transmitting only light with wavelengths of given colors (e.g., red, green, and blue) are provided in each pixel. A desired color is produced in such a manner that transmission of white light is controlled in each subpixel and a plurality of colors are mixed in each pixel. In contrast, in a display apparatus that performs display by the latter method, a plurality of light sources such as backlights that emit light of different colors (e.g., red, green, and blue) are provided. A desired color is produced in such a manner that the plurality of light sources sequentially emit light and transmission of light of each color is controlled in the corresponding pixel. In other words, the former method produces a desired color by dividing the area of one pixel for light of each given color, whereas the latter method produces a desired color by time-dividing a display period for light of each given color.

The display apparatus that performs display by a field-sequential method has the following advantages over the display apparatus that performs display by a color filter method. First, in the display apparatus that performs display by a field-sequential method, it is not necessary to provide subpixels in each pixel. Thus, the aperture ratio can be increased or the number of pixels can be increased. In addition, in the display apparatus that performs display by a field-sequential method, it is not necessary to provide a color filter. In other words, light loss due to light absorption in color filters does not occur. Therefore, it is possible to improve the light transmittance and reduce the power consumption.

Patent Documents 1 and 2 disclose a display apparatus that performs display by a field-sequential method. Specifically, in Patent Document 1, image data is simultaneously supplied to pixels arranged in a plurality of rows, so that the frequency of inputting image data to each pixel can be increased without changing the response speed of a transistor or the like included in the display apparatus. In Patent Document 2, image data is written to pixels arranged in a specific row, and then image data is written to pixels arranged in a row that is isolated from the specific row. In this manner, image data writing and backlight lighting are not performed in all the pixels, but image data writing and backlight lighting can be sequentially performed in specific pixels.

REFERENCE

Patent Document

[Patent Document 1]
[Patent Document 1] Japanese Published Patent Application No. 2012-003236
[Patent Document 2]
[Patent Document 2] Japanese Published Patent Application No. 2012-141569

SUMMARY OF THE INVENTION

Problems to be Solved by the Invention

In the case where a display apparatus performing display by a field-sequential method and including a liquid crystal device as a display device performs row-by-row image data writing instead of simultaneous image data writing to all the pixels, lighting of the light sources such as backlights needs to be waited until the liquid crystal devices included in the pixels in the last row respond, after image data is written to the pixels in the last row. For this reason, in the case where image data is written row by row, a waiting time is also caused after the response of the liquid crystal devices is completed in the pixels other than those in the last row; thus, the display apparatus has lower operation speed than that performing simultaneous image data writing to all the pixels. This reduces frame frequency and might cause, for example, a phenomenon called color breakup in which images for respective colors are not synthesized and are separately recognized.

In addition, even when image data is written row by row, operation of the display apparatus by a backlight scanning method in which a light source corresponding to a pixel in which a liquid crystal device is responding is turned off allows the display apparatus to have substantially the same operation speed as that performing simultaneous image data writing to all the pixels. However, in this case, fabrication cost of the display apparatus might be increased and the flexibility of the light source arrangement might be lowered.

An object of one embodiment of the present invention is to provide a display apparatus that operates at high speed. Another object of one embodiment of the present invention is to provide a display apparatus that can display a high-quality image. Another object of one embodiment of the present invention is to provide an inexpensive display apparatus. Another object of one embodiment of the present invention is to provide a low-power display apparatus. Another object of one embodiment of the present invention is to provide a highly reliable display apparatus. Another object is to provide a novel display apparatus. Another object is to provide a novel semiconductor device and the like.

Another object is to provide a display apparatus which operates at high speed and an operating method thereof. Another object is to provide an operation method of a display apparatus that can display a high-quality image. Another object is to provide an operation method of an inexpensive display apparatus. Another object is to provide an operation method of a low-power display apparatus. Another object is to provide an operation method of a highly reliable display apparatus. Another object is to provide an operation method of a novel display apparatus. Another object is to provide an operation method of a novel semiconductor device and the like.

Note that the descriptions of these objects do not disturb the existence of other objects. One embodiment of the present invention does not have to achieve all the objects. Other objects will be apparent from and can be derived from the descriptions of the specification, the drawings, the claims, and the like.

Means for Solving the Problems

One embodiment of the present invention is an operation method of a display apparatus including a display portion provided with a pixel. The display portion has a function of displaying a first-color image and a second-color image. The operation method includes a first period in which first image data and first data are written to the pixel, a second period in which the first-color image corresponding to the first image data is displayed on the display portion, a third period in which second image data is generated in the pixel on the basis of the first image data and the first data, and a fourth period in which the second-color image corresponding to the second image data is displayed on the display portion.

In the above embodiment, a reference potential may be supplied to the pixel in the third period to generate the second image data in the pixel on the basis of the first image data and the first data.

In the above embodiment, the third period may be shorter than the first period.

Alternatively, in the above embodiment, the display apparatus may include a source driver. The source driver may be electrically connected to the pixel through a first data line. The source driver may be electrically connected to the pixel through a second data line. The source driver may have a function of generating the first image data and the first data. In the first period, the first image data may be written to the pixel through the first data line and the first data may be written to the pixel through the second data line.

One embodiment of the present invention is an operation method of a display apparatus including a display portion provided with a pixel. The display portion has a function of displaying a first-color image, a second-color image, and a third-color image. The operation method includes a first period in which first image data and first data are written to the pixel, a second period in which the first-color image corresponding to the first image data is displayed on the display portion, a third period in which second image data is generated in the pixel on the basis of the first image data and the first data, a fourth period in which the second-color image corresponding to the second image data is displayed on the display portion, a fifth period in which third image data and second data are written to the pixel, a sixth period in which the third-color image corresponding to the third image data is displayed on the display portion, a seventh period in which fourth image data is generated in the pixel on the basis of the third image data and the second data, an eighth period in which the first-color image corresponding to the fourth image data is displayed on the display portion, a ninth period in which fifth image data and third data are written to the pixel, a tenth period in which the second-color image corresponding to the fifth image data is displayed on the display portion, an eleventh period in which sixth image data is generated in the pixel on the basis of the fifth image data and the third data, and a twelfth period in which the third-color image corresponding to the sixth image data is displayed on the display portion.

In the above method, a reference potential may be supplied to the pixel in the third period to generate the second image data in the pixel on the basis of the first image data and the first data. The reference potential may be supplied to the pixel in the seventh period to generate the fourth image data in the pixel on the basis of the third image data and the second data. The reference potential may be supplied to the pixel in the eleventh period to generate the sixth image data in the pixel on the basis of the fifth image data and the third data.

In the above embodiment, the third, seventh, and eleventh periods may be shorter than the first, fifth, and ninth periods.

In the above embodiment, the display apparatus may include a source driver. The source driver may be electrically connected to the pixel through a first data line. The source driver may be electrically connected to the pixel through a second data line. The source driver may have a function of generating the first, third, and fifth image data and the first to third data. In the first period, the first image data may be written to the pixel through the first data line and the first data may be written to the pixel through the second data line. In the fifth period, the third image data may be written to the pixel through the first data line and the second data may be written to the pixel through the second data line. In the ninth period, the fifth image data may be written to the pixel through the first data line and the third data may be written to the pixel through the second data line.

In the above embodiment, the pixel may include a memory circuit and a display device, and the memory circuit may be electrically connected to the first data line and the second data line.

In the above embodiment, the memory circuit may include a first transistor, a second transistor, and a capacitor. One of a source and a drain of the first transistor may be electrically connected to one electrode of the capacitor. The other of the source and the drain of the first transistor may be electrically connected to the first data line. One of a source and a drain of the second transistor may be electrically connected to the other electrode of the capacitor. The other of the source and the drain of the second transistor may be electrically connected to the second data line.

In the above embodiment, the first transistor may include a metal oxide in a channel formation region, and the metal oxide may include In, Zn, and M (M is Al, Ti, Ga, Sn, Y, Zr, La, Ce, Nd, or Hf).

In the above embodiment, the display device may be a liquid crystal device.

Effect of the Invention

With the use of one embodiment of the present invention, a display apparatus that operates at high speed can be provided. Alternatively, a display apparatus that can display a high-quality image can be provided. Alternatively, an inexpensive display apparatus can be provided. Alternatively, a low-power display apparatus can be provided. Alternatively, a highly reliable display apparatus can be provided. Alternatively, a novel display apparatus can be provided. Alternatively, a novel semiconductor device and the like can be provided.

Alternatively, an operation method of a display apparatus that operates at high speed can be provided. Alternatively, an operation method of a display apparatus that can display a high-quality image can be provided. Alternatively, an operation method of an inexpensive display apparatus can be provided. Alternatively, an operation method of a low-power display apparatus can be provided. Alternatively, an operation method of a highly reliable display apparatus can be provided. Alternatively, an operation method of a novel display apparatus can be provided. Alternatively, an operation method of a novel semiconductor device and the like can be provided.

Note that the descriptions of the effects do not disturb the existence of other effects. One embodiment of the present invention does not need to have all the effects. Other effects can be derived from the descriptions of the specification, the drawings, and the claims.

BRIEF DESCRIPTION OF THE DRAWINGS

FIG. 2 is a diagram showing an example of an operation method of a display apparatus.

FIGS. 8A-8D are circuit diagrams showing an example of an operation method of a display apparatus.

FIGS. 17A-17B4 are diagrams showing an operation method of a pixel on which simulation is performed.

Figure 1A:
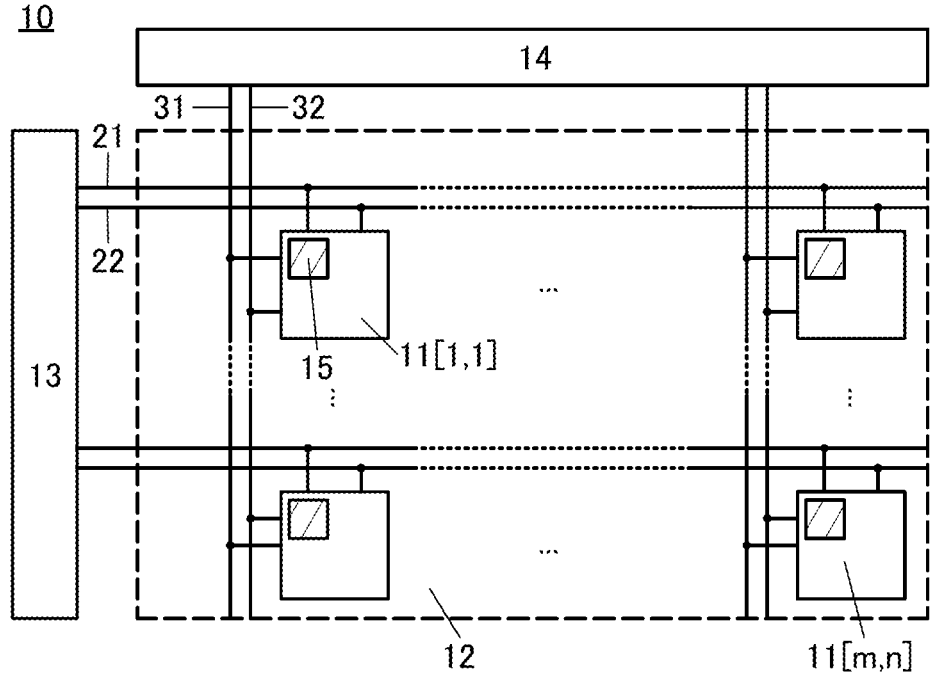
FIG. 1A is a block diagram illustrating a structure example of a display apparatus and FIG. 1B is a circuit diagram showing a configuration example of a pixel circuit.

Embodiments will be described in detail with reference to the drawings. Note that the present invention is not limited to the following description, and it will be readily appreciated by those skilled in the art that modes and details of the present invention can be modified in various ways without departing from the spirit and scope of the present invention. Therefore, the present invention should not be interpreted as being limited to the description of embodiments below. Note that in structures of the invention described below, the same reference numerals are used, in different drawings, for the same portions or portions having similar functions, and repeated description thereof is omitted in some cases. Note that the hatching of the same component that constitutes a drawing is omitted or changed as appropriate in different drawings in some cases.

EMBODIMENT 1

In this embodiment, a display apparatus of one embodiment of the present invention and operation methods thereof will be described with reference to drawings.

One embodiment of the present invention is an operation method of a display apparatus in which first image data and first data are written to a pixel, an image corresponding to the first image data is displayed, second image data is generated in the pixel on the basis of the first image data and the first data, and then an image corresponding to the second image data is displayed. In this case, displayed images can be switched at high speed compared to the case where the second image data as well as the first image data is written to a pixel from the outside of the pixel, leading to high-speed operation of the display apparatus.

Note that the pixel included in the display apparatus of one embodiment of the present invention includes a memory circuit in addition to a display device. The first image data is retained in the memory circuit, whereby the second image data can be generated in the pixel on the basis of the first image data and the first data, after the image corresponding to the first image data is displayed.

The operation method of the display apparatus of one embodiment of the present invention can be applied to, for example, a display apparatus that performs display by a field-sequential method and includes a liquid crystal device as a display device. In such a display apparatus, a plurality of light sources such as backlights that emit light of different colors (e.g., red, green, and blue) are provided. An image is displayed in such a manner that the plurality of light sources sequentially emit light and transmission of light of each color is controlled in the corresponding pixel. In other words, a display period is time-divided for light of each given color. Thus, in a display apparatus that does not operate at high speed, the frame frequency is reduced and color breakup might occur, for example.

In the operation method of the display apparatus of one embodiment of the present invention, the first image data can be image data corresponding to red, green, or blue, for example. Furthermore, the second image data can be image data corresponding to a color different from that of the first image data. Thus, a displayed image is switched from the image corresponding to the first image data to the image corresponding to the second image data, whereby the color of the displayed image can be switched. As described above, in the operation method of the display apparatus of one embodiment of the present invention, displayed images can be switched at high speed; thus, the frame frequency can be increased even in the case of performing display by a field-sequential method, thereby inhibiting occurrence of color breakup, for example. Thus, the quality of an image displayed by the display apparatus can be improved.

FIG. 1(A) is a diagram illustrating a structure example of a display apparatus 10 that is the display apparatus of one embodiment of the present invention. The display apparatus 10 includes a display portion 12 in which pixels 11 are arranged in a matrix of m rows and n columns, a gate driver 13, and a source driver 14. In addition, a memory circuit 15 is provided in each of the pixels 11.

In this specification and the like, for example, the pixel 11 in the first row and the first column is referred to as the pixel 11[1, 1], and the pixel 11 in the m-th row and the n-th column is referred to as the pixel 11 [m, n]. Note that similar expressions are used for other components in some cases.

The pixel 11 is electrically connected to the other pixels 11 in the same row through a wiring 21, and electrically connected to the other pixels 11 in the same row through a wiring 22. In addition, the pixel 11 is electrically connected to the other pixels 11 in the same column through a wiring 31, and electrically connected to the other pixels 11 in the same column through a wiring 32.

The gate driver 13 is electrically connected to m wirings 21 and m wirings 22. The source driver 14 is electrically connected to n wirings 31 and n wirings 32.

The gate driver 13 has a function of supplying a signal to the pixels 11 through the wiring 21 and controlling the operation of the pixels 11. In addition, the gate driver 13 has a function of supplying a signal to the pixels 11 through the wiring 22 and controlling the operation of the pixels 11. The wiring 21 and the wiring 22 each have a function of a scan line.

The source driver 14 has a function of supplying generated image data and the like to the pixels 11 through the wiring 31. The source driver 14 has a function of supplying generated data and the like to the pixels 11 through the wiring 32. The wiring 31 and the wiring 32 each have a function of a data line.

In this specification and the like, image data refers to data that expresses an image displayed on the display portion 12 and the like. In other words, the display portion 12 can be regarded as having a function of displaying an image corresponding to the image data.

The memory circuit 15 has a function of retaining the image data supplied to the pixel 11 through the wiring 31. In addition, the memory circuit 15 has a function of generating new image data on the basis of the retained image data and the data supplied to the pixel 11 through the wiring 32, and retaining the new image data. That is, the new image data can be regarded as image data generated in the pixel 11.

The display apparatus 10 can perform display by a field-sequential method. In this case, the image data supplied to the pixels 11 through the wiring 31 and the image data generated in the pixels 11 on the basis of the image data can be image data corresponding to different colors. For example, in the case where the display apparatus 10 displays an image with red, green, and blue, the image data supplied to the pixels 11 through the wiring 31 can be image data expressing a red image, and the image data generated in the pixels 11 on the basis of the image data can be image data expressing a green image.

The display apparatus 10 does not necessarily have a function of performing display by a field-sequential method. In this case, both the image data supplied to the pixels 11 through the wiring 31 and the image data generated in the pixels 11 can be the image data expressing all of a red image, a green image, and a blue image. Note that in the case where the display apparatus 10 does not have a function of performing display by a field-sequential method, the display portion 12 can be provided with a pixel composed of a subpixel having a function of displaying a red image, a subpixel having a function of displaying a green image, and a subpixel having a function of displaying a blue image, for example. In this case, the pixels 11 corresponds to the subpixels.

The display apparatus 10 may have a function of displaying an image with white in addition to red, green, and blue. Alternatively, the display apparatus 10 may have a function of displaying an image with yellow, magenta, cyan, and the like in addition to the above colors or instead of the above colors.

Figure 1B:
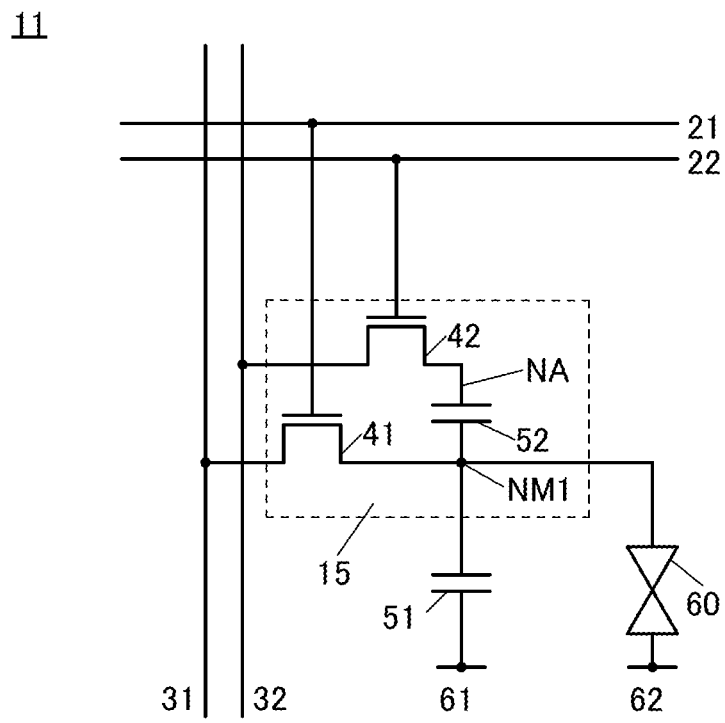

FIG. 1(B) is a diagram illustrating a configuration example of the pixel 11. The pixel 11 includes a transistor 41, a transistor 42, a capacitor 51, a capacitor 52, and a display device 60. The memory circuit 15 provided in the pixel 11 can be regarded as being composed of the transistor 41, the transistor 42, and the capacitor 52. Note that although both the transistor 41 and the transistor 42 are n-channel transistors in FIG. 1(B), one or both of the transistors may be p-channel transistors.

Here, a liquid crystal device or the like can be used as the display device 60. In this case, a light source such as a backlight is provided in the display apparatus 10. The light emitted from the light source is emitted to the display surface of the display portion 12 through the display device 60 that is a liquid crystal device. The light transmittance of the display device 60 is controlled, whereby an image can be displayed on the display portion 12. That is, the display apparatus 10 can be a transmissive liquid crystal display apparatus. Note that the light source is not illustrated in FIG. 1(A).

In the case where the display apparatus 10 has a function of performing display by a field-sequential method, an image is displayed on the display portion 12 in such a manner that light sources that emit light of different colors (e.g., red, green, and blue) are provided, the light sources sequentially emit light, and the light transmission of the display device 60 is controlled every time the light source emitting light is switched. In other words, the display period is time-divided for each color.

One of a source and a drain of the transistor 41 is electrically connected to one electrode of the capacitor 52. One of a source and a drain of the transistor 42 is electrically connected to the other electrode of the capacitor 52. The one electrode of the capacitor 52 is electrically connected to one electrode of the capacitor 51. The one electrode of the capacitor 51 is electrically connected to one electrode of the display device 60. Note that a node that is electrically connected to the one of the source and the drain of the transistor 41, the one electrode of the capacitor 52, the one electrode of the capacitor 51, and the one electrode of the display device 60 is referred to as a node NM1. A node that is electrically connected to the one of the source and the drain of the transistor 42 and the other electrode of the capacitor 52 is referred to as a node NA. That is, the node NM1 and the node NA can be regarded as being provided in the memory circuit 15.

The other of the source and the drain of the transistor 41 is electrically connected to the wiring 31. The other of the source and the drain of the transistor 42 is electrically connected to the wiring 32. A gate of the transistor 41 is electrically connected to the wiring 21. A gate of the transistor 42 is electrically connected to the wiring 22. The other electrode of the capacitor 51 is electrically connected to a wiring 61. The other electrode of the display device 60 is electrically connected to a wiring 62. Here, the wiring 61 and the wiring 62 each have a function of a power supply line. The wiring 61 and the wiring 62 are supplied with a ground potential, for example.

The transistor 41 and the transistor 42 each have a function of a switch. Here, conduction and non-conduction of the transistor 41 are controlled on the basis of the signal supplied through the wiring 21. In addition, conduction and non-conduction of the transistor 42 are controlled on the basis of the signal supplied through the wiring 22. When the transistor 41 is turned on, the image data or the like supplied through the wiring 31 is written to the node NM1 as a charge (a potential), and when the transistor 41 is turned off, the image data or the like written to the node NM1 is retained. When the transistor 42 is turned on, the data or the like supplied through the wiring 32 is written to the node NA as a charge (a potential), and when the transistor 42 is turned off, the data or the like written to the node NA is retained.

Here, using a transistor with an extremely low off-state current as the transistor 41 and the transistor 42 can make the leakage of charge retained in the node NM1 and the node NA extremely low. Accordingly, the potentials of the node NM1 and the node NA can be retained for a long time. As the transistor, a transistor using a metal oxide in a channel formation region (hereinafter an OS transistor) can be used, for example.

As a semiconductor material used for an OS transistor, a metal oxide whose band gap is greater than or equal to 2 eV, preferably greater than or equal to 2.5 eV, more preferably greater than or equal to 3 eV can be used. A typical example is an oxide semiconductor containing indium, and a CAAC-OS or a CAC-OS described later can be used, for example. The CAAC-OS is a crystalline oxide semiconductor. A transistor using the crystalline oxide semiconductor can have improved reliability and thus is favorably used for the display apparatus of one embodiment of the present invention. A CAC-OS has high mobility characteristics and thus is suitable for a transistor that operates at high speed, and the like.

An OS transistor has a large band gap and thus has an extremely low off-state current. An OS transistor has features that impact ionization, an avalanche breakdown, a short-channel effect, and the like do not occur, for example, which are different from those of a transistor containing Si in its channel formation region (hereinafter referred to as an Si transistor), leading to formation of a highly reliable circuit.

Note that Si transistors may be used as the transistor 41 and the transistor 42. Alternatively, an OS transistor may be used as one of the transistor 41 and the transistor 42, and a Si transistor may be used as the other. For example, an OS transistor may be used as the transistor 41 and a Si transistor may be used as the transistor 42. Examples of the Si transistor include a transistor containing amorphous silicon, a transistor containing crystalline silicon (typically, low-temperature polysilicon), and a transistor containing single crystal silicon.

Figure 2:
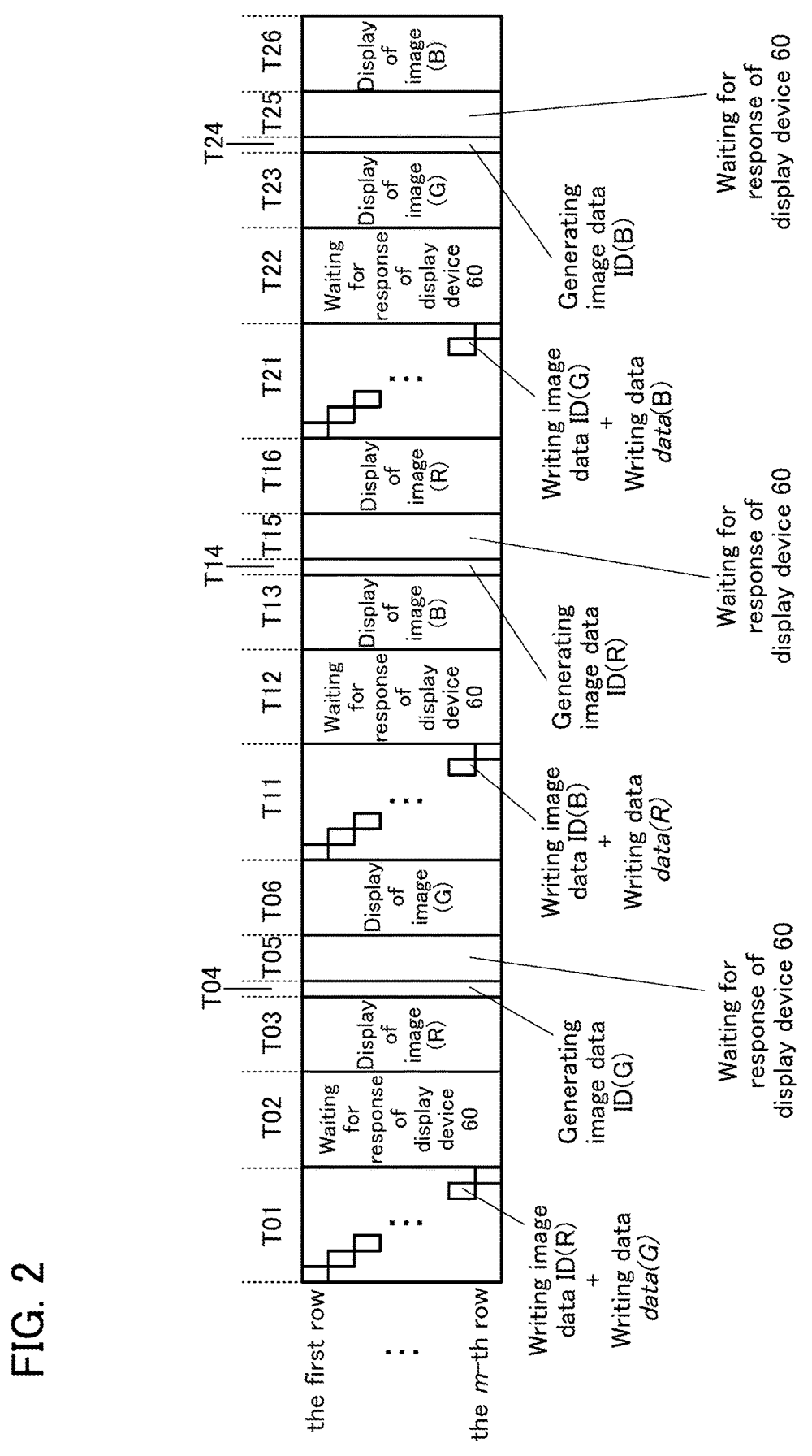

Next, an example of an operation method of the display apparatus 10 in the case where the display apparatus 10 performs display by a field-sequential method will be described. FIG. 2 is a diagram showing an example of the operation method of the display apparatus 10, and shows an operation from a period T01 to a period T26. In FIG. 2, the top portion shows an operation of the pixel 11 in the first row and the bottom portion shows an operation of the pixel 11 in the m-th row.

In this specification and the like, an image (R) represents a red image, an image (G) represents a green image, and an image (B) represents a blue image. In addition, image data ID(R) represents image data expressing the image (R), image data ID(G) represents image data expressing the image (G), and image data ID(B) represents image data expressing the image (B). Furthermore, although details will be described later, data data(R) represents base data of the image data ID(R), data data(G) represents base data of the image data ID(G), and data data(B) represents base data of the image data ID(B).

In this specification and the like, the pixel 11 in the i-th row (i is an integer of 1 or more and m or less) is denoted by a pixel 11[i]. Note that similar expressions are used for other components in some cases. Furthermore, the image data ID(R), the image data ID(G), the image data ID(B), the data data(R), the data data(G), and the data data(B) that are written to pixels in the i-th row, such as the pixel 11[i], are denoted by the image data ID(R)[i], the image data ID(G)[i], the image data ID(B)[i], the data data(R)[i], the data data(G)[i], and the data data(B) [i], respectively. Furthermore, the image data ID(R), the image data ID(G), the image data ID(B), the data data(R), the data data(G), and the data data(B) that are written to pixels in any of the first to m-th rows are denoted by the image data ID(R)[1:m], the image data ID(G)[1:m], the image data ID(B)[1:m], the data data(R)[1:m], the data data(G)[1:m], and the data data(B)[1:m], respectively.

Figure 3:
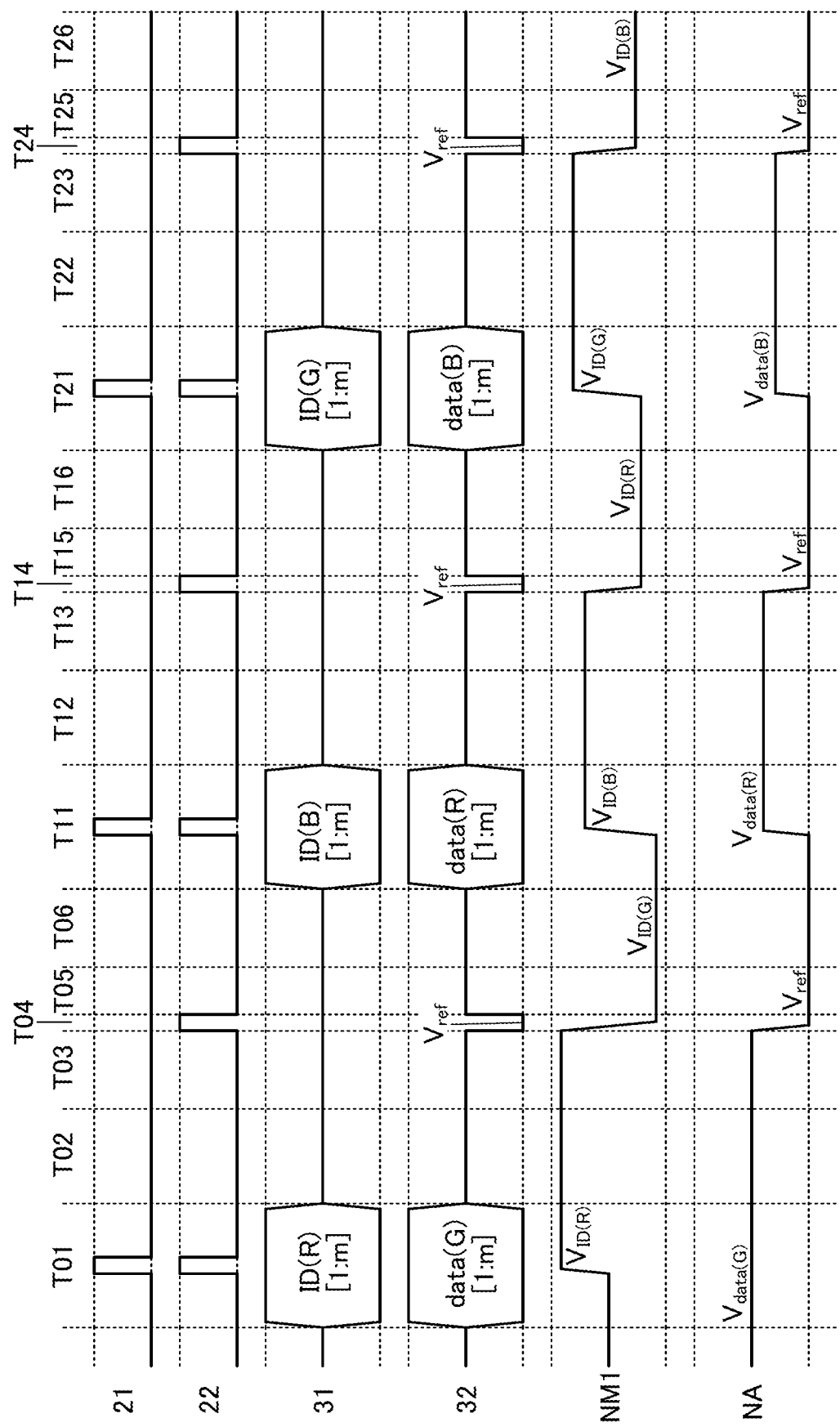
FIG. 3 is a timing chart showing an example of an operation method of a display apparatus.

FIG. 3 is a timing chart showing an example of the operation method of the pixel 11 in the periods shown in FIG. 2. Note that FIG. 2 and FIG. 3 show a case where the image (R) that is a red image, the image (G) that is a green image, and the image (B) that is a blue image are displayed in this order, and then the image (R), the image (G), and the image (B) are displayed in this order again.

Figure 4A:
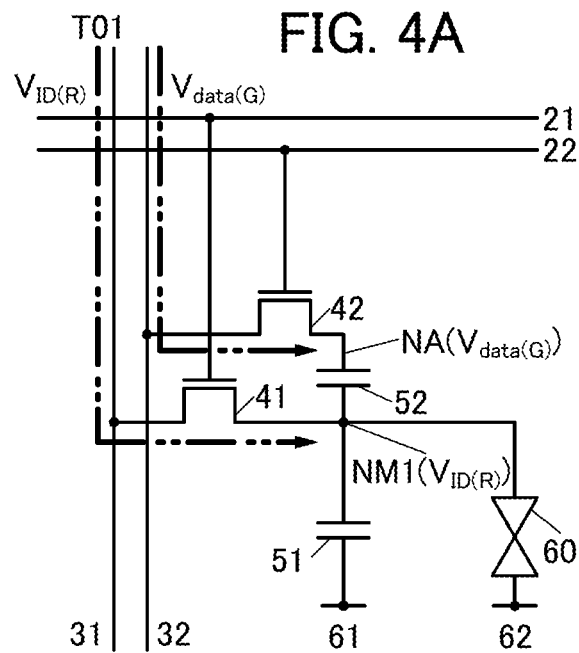
FIGS. 4A-4D are circuit diagrams showing an example of an operation example of a display apparatus.

FIGS. 4(A), 4(B), 4(C), and 4(D) are circuit diagrams showing a specific example of the operation method of the pixel 11 from the period T01 to the period T06 of the periods shown in FIG. 2 and FIG. 3. A specific example of the operation method of the pixel 11 in the period T01 is shown in FIG. 4(A), the period T02 and the period T03 in FIG. 4(B), the period T04 in FIG. 4(C), and the period T05 and the period T06 in FIG. 4(D). Note that the operation shown in FIG. 3 and FIG. 4 can be applied to the pixels 11 in any of the first row to the m-th row.

In the period T01, the image data ID(R) and the data data(G) are written to the pixel 11. Specifically, the potential of the wiring 21 and the potential of the wiring 22 are each set to a high potential, the image data ID(R)[i] is supplied to the pixel 11[i] through the wiring 31, and the data data(G)[i] is supplied to the pixel 11[i] through the wiring 32. Accordingly, the transistor 41 and the transistor 42 are turned on, the potential of the node NM1 becomes a potential $V_{ID(R)}$ that is a potential corresponding to the image data ID(R), and the potential of the node NA becomes a potential $V_{data(G)}$ that is a potential corresponding to the data data(G). That is, the image data ID(R) and the data data(G) are written to the pixel 11 from the outside of the pixel 11.

In the pixel 11[i] to which the image data ID(R)[i] and the data data(G)[i] have been written, the potential of the wiring 21 and the potential of the wiring 22 are each set to a low potential. Accordingly, the transistor 41 and the transistor 42 are turned off, the potential $V_{ID(R)}$ is retained in the node NM1, and the potential $V_{data(G)}$ is retained in the node NA.

In this specification and the like, a low potential can be a negative potential, for example. Alternatively, the low potential can be a ground potential, for example.

Here, as shown in FIG. 2, the image data ID(R) and the data data(G) are sequentially written row by row to the pixels 11 in the first row to the pixels 11 in the m-th row. That is, the image data ID(R) and the data data(G) are written in a line-sequential manner. Note that the period T01 can be a period from the start of writing of the image data ID(R) and the data data(G) to the pixels 11 in the first row to the end of the writing of the image data ID(R) and the data data(G) to the pixels 11 in the m-th row.

In the period T02, the response of the display device 60 is waited for. Specifically, while the transistor 41 and the transistor 42 are in a non-conduction state, the end of the response of the display device 60 included in each of the pixels 11 in the m-th row is waited for.

Figure 4B:
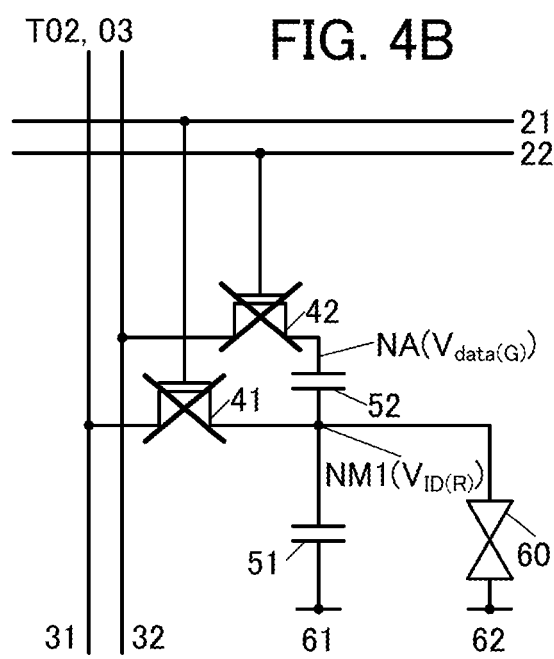
Figure 4C:
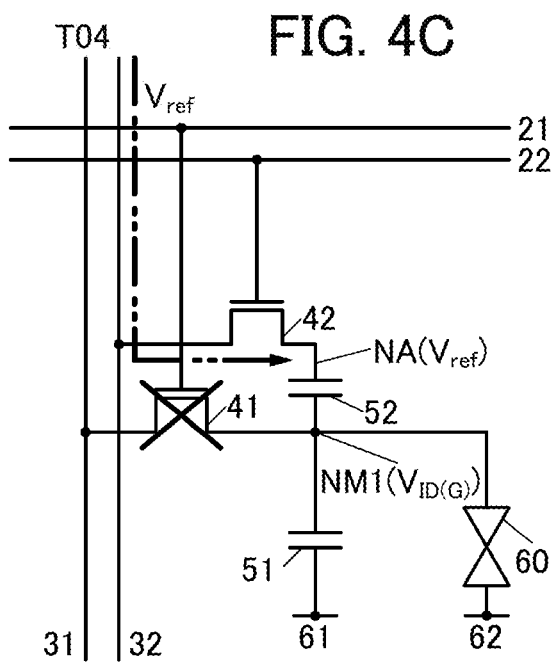
Figure 4D:
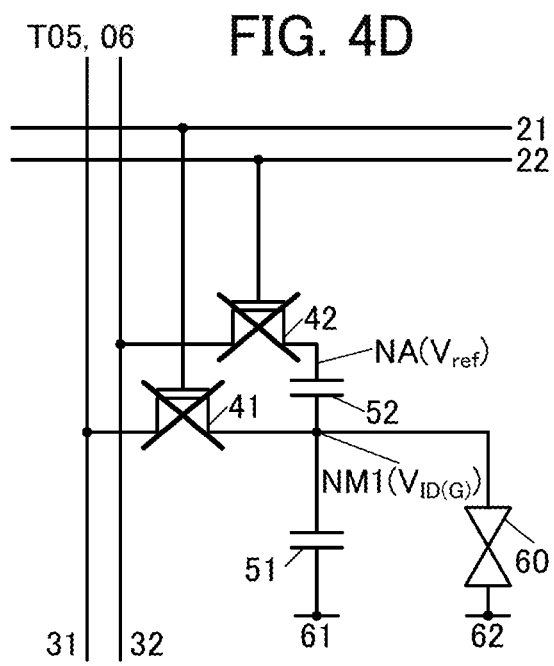

In the period T03, the image (R) is displayed on the display portion 12. For example, the red light source provided in the display apparatus 10 is made to emit light, whereby the image (R) corresponding to the image data ID(R) can be displayed. Here, as shown in FIG. 4(B), the potential $V_{ID(R)}$ that is a potential corresponding to the image data ID(R) is applied to the one electrode of the display device 60. The potential $V_{ID(R)}$ does not depend on the data data(G) written to the pixel 11 in the period T01; thus, the image (R) corresponding to the image data ID(R) can be displayed.

In the period T04, the image data ID(G) is generated in the pixel 11 on the basis of the image data ID(R) and the data data(G) that are retained in the pixel 11. Specifically, the potential of the wiring 22 is set to a high potential and the potential of the wiring 32 is set to a potential $V_{ref}$. Accordingly, the transistor 42 is turned on and the potential of the node NA becomes the potential $V_{ref}$. A potential $V_{NM1}$ of the node NM1 is represented by the following formula. Here, $C_1$ represents the sum of the capacitance value of the capacitor 51 and the capacitance value of the display device 60, and $C_2$ represents the capacitance value of the capacitor 52.

[Formula 1]

$$V_{NM1} = V_{ID(R)} + \frac{C_2}{C_1 + C_2}(-V_{data(G)} + V_{ref}) \quad (1)$$

When the capacitive coupling coefficient of the node NM1 is 1, the potential $V_{NM1}$ is represented by the following formula.

[Formula 2]

$$V_{NM1} = V_{ID(R)} - V_{data(G)} + V_{ref} \quad (2)$$

In other words, when the potential $V_{data(G)}$ that is a potential written to the node NA in the period T01 is set such that the potential $V_{NM1}$ becomes the potential $V_{ID(G)}$ that is a potential corresponding to the image data ID(G), the image data ID(G) is generated in the pixel 11.

Note that the potential $V_{ref}$ can be a reference potential. For example, all the pixels 11 can be supplied with the same potential $V_{ref}$. Thus, for example, all the pixels 11 can be supplied with the potential $V_{ref}$ at the same time. Thus, the image data ID(G) can be generated in the pixels 11 in an area-sequential manner. Accordingly, the period T04 is shorter than the period T01 in which image data and the like are written in a line-sequential manner.

In the period T05, the response of the display device 60 is waited for. Specifically, the potential of the wiring 21 and the potential of the wiring 22 are each set to a low potential. Accordingly, the transistor 41 and the transistor 42 are turned off, the potential $V_{ID(G)}$ is retained in the node NM1, and the potential $V_{ref}$ is retained in the node NA. In this state, the end of the response of the display device 60 is waited for.

As described above, in the period T04, the image data ID(G) can be generated in the pixels 11 in an area-sequential manner. Accordingly, generation of display unevenness can be inhibited even when the image (G) is displayed before the response of the display device 60 is completed, and thus a high-quality image can be displayed. Thus, the waiting time for the response of the display device 60 can be shorter than that in the case where the image data is written to the pixels 11 in a line-sequential manner as in the period T01. That is, the period T05 can be shorter than the period T02.

In the period T06, the image (G) is displayed on the display portion 12. For example, the green light source provided in the display apparatus 10 is made to emit light, whereby the image (G) corresponding to the image data ID(G) can be displayed.

In the period T11, the image data ID(B) and the data data(R) are written to the pixel 11. Specifically, the potential of the wiring 21 and the potential of the wiring 22 are each set to a high potential, the image data ID(B)[i] is supplied to the pixel 11[i] through the wiring 31, and the data data(R)[i] is supplied to the pixel 11[i] through the wiring 32. Accordingly, the transistor 41 and the transistor 42 are turned on, the potential of the node NM1 becomes a potential $V_{ID(B)}$ corresponding to the image data ID(B), and the potential of the node NA becomes a potential $V_{data}(R)$ corresponding to the data data(R). That is, the image data ID(B) and the data data(R) are written to the pixel 11 from the outside of the pixel 11.

In the pixel 11[i] to which the image data ID(B)[i] and the data data(R)[i] have been written, the potential of the wiring 21 and the potential of the wiring 22 are each set to a low potential. Accordingly, the transistor 41 and the transistor 42 are turned off, the potential $V_{ID(B)}$ is retained in the node NM1, and the potential $V_{data}(R)$ is retained in the node NA.

The image data ID(B) and the data data(R) are written in a line-sequential manner. Note that the period T11 can be a period from the start of writing of the image data ID(B) and the data data(R) to the pixel 11 in the first row to the end of the writing of the image data ID(B) and the data data(R) to the pixel 11 in the m-th row.

In a period T12, the response of the display device 60 is waited for as in the period T02 and the like.

In a period T13, the image (B) is displayed on the display portion 12. For example, the blue light source provided in the display apparatus 10 is made to emit light, whereby the image (B) corresponding to the image data ID(B) can be displayed.

In a period T14, operations similar to those in the period T04 are performed, so that the image data ID(R) is generated in the pixel 11 on the basis of the image data ID(B) and the data data(R) that are retained in the pixel 11. The potential $V_{NM1}$ of the node NM1 is a value obtained by replacing the potential $V_{ID(R)}$ with the potential $V_{ID(B)}$ and replacing the potential $V_{data(G)}$ with the potential $V_{data}(R)$ in Formula 1. In other words, when the potential $V_{data(R)}$ that is a potential written to the node NA in the period T11 is set such that the potential $V_{NM1}$ becomes the potential $V_{ID(R)}$ that is a potential corresponding to the image data ID(R), the image data ID(R) is generated in the pixel 11. Here, since the image data ID(R) can be generated in the pixels 11 in an area-sequential manner in the period T14, the period T14 is shorter than the period T11 in which image data and the like are written in a line-sequential manner.

In a period T15, the response of the display device 60 is waited for. Specifically, the potential of the wiring 21 and the potential of the wiring 22 are each set to a low potential. Accordingly, the transistor 41 and the transistor 42 are turned off, the potential $V_{ID(R)}$ is retained in the node NM1, and the potential \T$_{ref}$ is retained in the node NA. In this state, the end of the response of the display device 60 is waited for. Note that as described above, in the period T14, the image data ID(R) can be generated in the pixels 11 in an area-sequential manner; thus, the period T15 can be shorter than the period T12.

In a period T16, operations similar to those in the period T03 are performed, so that the image (R) is displayed on the display portion 12.

In a period T21, the image data ID(G) and the data data(B) are written to the pixel 11. Specifically, the potential of the wiring 21 and the potential of the wiring 22 are each set to a high potential, the image data ID(G)[i] is supplied to the pixel 11[i] through the wiring 31, and the data data(B)[i] is supplied to the pixel 11[i] through the wiring 32. Accordingly, the transistor 41 and the transistor 42 are turned on, the potential of the node NM1 becomes a potential $V_{ID(G)}$ that is a potential corresponding to the image data ID(G), and the potential of the node NA becomes a potential $V_{data}(B)$ that is a potential corresponding to the data data(B). That is, the image data ID(G) and the data data(B) are written to the pixel 11 from the outside of the pixel 11.

In the pixel 11[i] to which the image data ID(G)[i] and the data data(B)[i] have been written, the potential of the wiring 21 and the potential of the wiring 22 are each set to a low potential. Accordingly, the transistor 41 and the transistor 42 are turned off, the potential $V_{ID(G)}$ is retained in the node NM1, and the potential $V_{data}(B)$ is retained in the node NA.

Here, the image data ID(G) and the data data(B) are written in a line-sequential manner. Note that the period T21 can be a period from the start of writing of the image data ID(G) and the data data(B) to the pixel 11 in the first row to the end of the writing of the image data ID(G) and the data data(B) to the pixel 11 in the m-th row.

In a period T22, the response of the display device 60 is waited for as in the period T02 and the like. In a period T23, operations similar to those in the period T06 are performed, so that the image (G) is displayed on the display portion 12.

In a period T24, operations similar to those in the period T04 are performed, so that the image data ID(B) is generated in the pixel 11 on the basis of the image data ID(G) and the data data(B) that are retained in the pixel 11. The potential $V_{NM1}$ of the node NM1 is a value obtained by replacing the potential $V_{ID(R)}$ with the potential $V_{ID(G)}$ and replacing the potential $V_{data(G)}$ with the potential $V_{data}(B)$ in Formula 1 and Formula 2. In other words, when the potential $V_{data(B)}$ that is a potential written to the node NA in the period T21 is set such that the potential $V_{NM1}$ becomes the potential $V_{ID(B)}$ that is a potential corresponding to the image data ID(B), the image data ID(B) is generated in the pixel 11. Here, since the image data ID(B) can be generated in the pixels 11 in an area-sequential manner in the period T24, the period T24 is shorter than the period T21 in which image data and the like are written in a line-sequential manner.

In a period T25, the response of the display device 60 is waited for. Specifically, the potential of the wiring 21 and the potential of the wiring 22 are each set to a low potential. Accordingly, the transistor 41 and the transistor 42 are turned off, the potential $V_{ID(B)}$ is retained in the node NM1, and the potential $V_{ref}$ is retained in the node NA. In this state, the end of the response of the display device 60 is waited for. Note that as described above, in the period T24, the image data ID(B) can be generated in the pixels 11 in an area-sequential manner; thus, the period T25 can be shorter than the period T22.

In a period T26, operations similar to those in the period T13 are performed, so that the image (B) is displayed on the display portion 12.

The above is an example of the operation method of the display apparatus 10. In the above operation method, images displayed on the display portion 12 can be switched at high speed compared with the case where image data is written to the pixel 11 from the outside of the pixel 11 in the period T04, the period T14, and the period T24, as in the period T01, the period T11, and the period T21. Thus, the display apparatus 10 can be operated at high speed.

In addition, in the above operation method, the display apparatus of one embodiment of the present invention can be operated at high speed even when the display apparatus of one embodiment of the present invention is not operated by a backlight scanning method. Accordingly, an increase in fabrication cost of the display apparatus of one embodiment of the present invention can be suppressed, which enables the display apparatus of one embodiment of the present invention to be provided at low cost. In addition, a reduction in flexibility of the light source arrangement can be inhibited.

In the case where the display apparatus of one embodiment of the present invention performs display by a field-sequential method, a display period is time-divided by a specific-color image. That is, as illustrated in FIG. 2 and the like, a red image is displayed in the period T03, a green image is displayed in the period T06, and a blue image is displayed in the period T13, for example, so that a one-frame color image is displayed. Thus, in a display apparatus that does not operate at high speed, the frame frequency is reduced and color breakup might occur, for example.

In contrast, in the above operation method, the display apparatus of one embodiment of the present invention can be operated at high speed; thus, the display apparatus of one embodiment of the present invention can have high frame frequency even when performing display by a field-sequential method. This can inhibit the occurrence of color breakup or the like, leading to a higher-quality image displayed by the display apparatus of one embodiment of the present invention.

Note that the display apparatus 10 can perform frame inversion driving by adjustment of the potential $V_{ref}$. For example, in the case where a potential corresponding to image data supplied to the pixel 11 through the wiring 31 and a potential corresponding to data supplied to the pixel 11 through the wiring 32 are each a positive potential, setting the potential $V_{ref}$ to a negative potential enables image data with a negative potential to be generated in the pixel 11. That is, the polarity of the potential corresponding to image data can be inverted, and thus the display apparatus 10 can perform the frame inversion driving. FIG. 3 shows a case where frame inversion driving is performed in the period T04, the period T11, the period T14, the period T21, and the period T24. When the display apparatus 10 performs the frame inversion driving, the display apparatus 10 can display a higher-quality image.

The operation method shown in FIG. 2 to FIG. 4 can be employed also in the case where the display apparatus 10 performs display by a method other than a field-sequential method. In this case, the image data ID(R), the image data ID(G), and the image data ID(B) that are shown in FIG. 2 can each be image data expressing all of a red image, a green image, and a blue image. In addition, in each of the period T03, the period T06, the period T13, the period T16, the period T23, and the period T26, a red image, a green image, and a blue image can be displayed at the same time. In other words, in each of the period T03, the period T06, the period T13, the period T16, the period T23, and the period T26, a one-frame color image can be displayed.

Figure 5A:
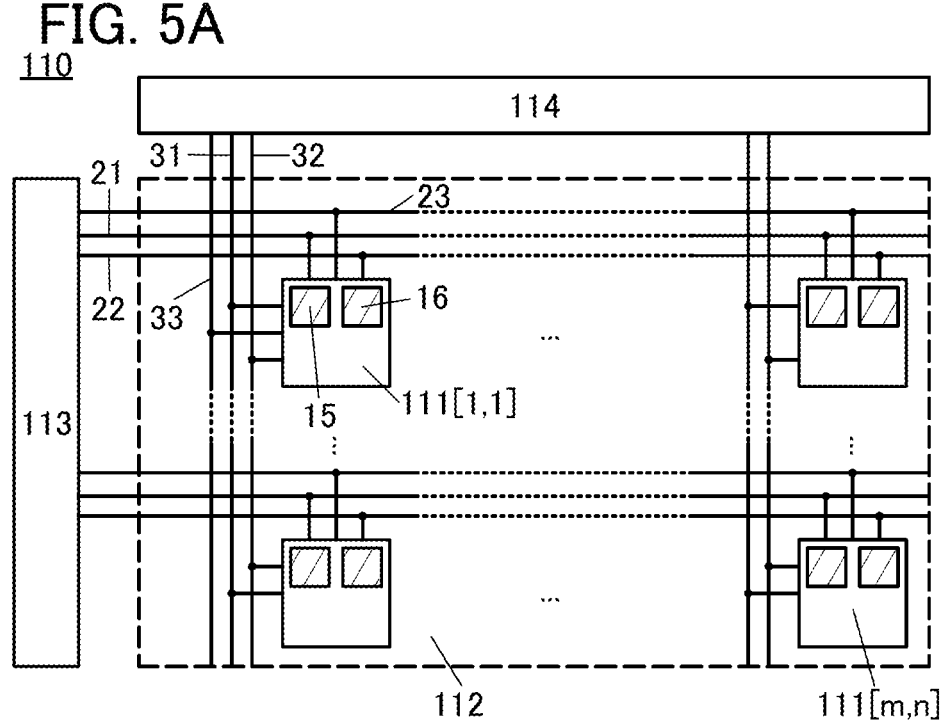
FIG. 5A is a block diagram illustrating a structure example of a display apparatus and FIG. 5B is a circuit diagram showing a configuration example of a pixel circuit.

FIG. 5(A) is a diagram illustrating a structure example of a display apparatus 110, which is the display apparatus of one embodiment of the present invention and has a structure different from that of the display apparatus 10. The display apparatus 110 includes a display portion 112 in which pixels 111 are arranged in a matrix of m rows and n columns, a gate driver 113, and a source driver 114. In addition, the memory circuit 15 and a memory circuit 16 are provided in each of the pixels 111.

The pixel 111 is electrically connected to the other pixels 111 in the same row through the wiring 21, electrically connected to the other pixels 111 in the same row through the wiring 22, and electrically connected to the other pixels 111 in the same row through a wiring 23. The pixel 111 is electrically connected to the other pixels 111 in the same column through the wiring 31, electrically connected to the other pixels 111 in the same column through the wiring 32, and electrically connected to the other pixels 111 in the same column through a wiring 33.

A gate driver 113 is electrically connected to m wirings 21, m wirings 22, and m wiring 23. A source driver 14 is electrically connected to n wirings 31, n wirings 32, and n wiring 33.

The gate driver 113 has a function of supplying a signal to the pixels 111 through the wiring 21 and controlling the operation of the pixels 111. In addition, the gate driver 113 has a function of supplying a signal to the pixels 111 through the wiring 22 and controlling the operation of the pixels 111. Furthermore, the gate driver 113 has a function of supplying a signal to the pixels 111 through the wiring 23 and controlling the operation of the pixels 111. The wiring 23 has a function of a scan line like the wiring 21 and the wiring 22.

The source driver 114 has a function of supplying generated image data and the like to the pixels 111 through the wiring 31. In addition, the source driver 114 has a function of supplying generated image data and the like to the pixels 111 through the wiring 32. Furthermore, the source driver 114 has a function of supplying generated image data and the like to the pixels 111 through the wiring 33. The wiring 33 has a function of a data line like the wiring 31 and the wiring 32.

The memory circuit 15 and the memory circuit 16 each have a function of retaining image data supplied to the pixels 111 through the wiring 31. The memory circuit 15 has a function of generating new image data on the basis of the retained data and the data supplied to the pixels 111 through the wiring 32, and retaining the new data. The memory circuit 16 has a function of generating new image data on the basis of the retained data and the data supplied to the pixels 111 through the wiring 33, and retaining the new data. That is, the new image data can be regarded as image data generated in the pixels 111.

Like the display apparatus 10, the display apparatus 110 can perform display by a field-sequential method. In this case, the image data supplied to the pixels 111 through the wiring 31, the image data generated on the basis of the data supplied to the pixels 111 through the wiring 32, and the image data generated on the basis of the data supplied to the pixels 111 through the wiring 33 can be image data corresponding to different colors. For example, in the case where the display apparatus 110 displays an image with red, green, and blue, the image data supplied to the pixels 111 through the wiring 31 can be image data expressing a red image, the image data generated on the basis of the data supplied to the pixels 111 through the wiring 32 can be image data expressing a green image, and the image data generated on the basis of the data supplied to the pixels 111 through the wiring 33 can be image data expressing a blue image.

The display apparatus 110 does not necessarily have a function of performing display by a field-sequential method. In this case, the image data supplied to the pixels 111 through the wiring 31, the image data supplied to the pixels 111 through the wiring 32, and the image data supplied to the pixels 111 through the wiring 33 can each be image data expressing all of a red image, a green image, and a blue image. Note that in the case where the display apparatus 110 does not have a function of performing display by a field-sequential method, the display portion 112 can be provided with a pixel composed of, for example, a subpixel having a function of displaying a red image, a subpixel having a function of displaying a green image, and a subpixel having a function of displaying a blue image. In this case, the pixels 111 corresponds to the subpixel s.

Like the display apparatus 10, the display apparatus 110 may have a function of displaying an image with white in addition to red, green, and blue. Alternatively, the display apparatus 110 may have a function of displaying an image with yellow, magenta, cyan, and the like in addition to the above colors or instead of the above colors.

Figure 5B:
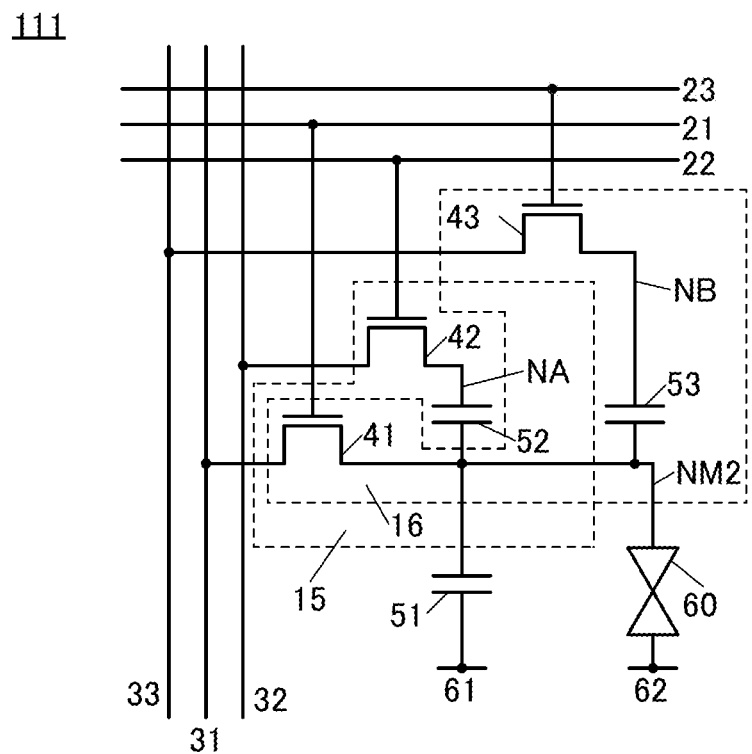

FIG. 5(B) is a diagram showing a configuration example of the pixel 111. The pixel 111 includes the transistor 41, the transistor 42, a transistor 43, the capacitor 51, the capacitor 52, a capacitor 53, and the display device 60. Note that the memory circuit 15 provided in the pixel 111 can be regarded as being composed of the transistor 41, the transistor 42, and the capacitor 52, as in the pixel 11. In addition, the memory circuit 16 provided in the pixel 111 can be regarded as being composed of the transistor 41, the transistor 43, and the capacitor 53. That is, the transistor 41 can be regarded as being shared by the memory circuit 15 and the memory circuit 16. Although the transistor 41 to the transistor 43 are all n-channel transistors in FIG. 5(B), some or all of the transistors may be p-channel transistors.

In the case where a liquid crystal device is used as the display device 60, the display apparatus 110 is provided with a plurality of light sources such as backlights that emit light of different colors (e.g. red, green, and blue), like the display apparatus 10. The light emitted from the light source is emitted to the display surface of the display portion 112 through the display device 60 that is a liquid crystal device. The light transmittance of the display device 60 is controlled, whereby an image can be displayed on the display portion 112. That is, the display apparatus 110 can be a transmissive liquid crystal display apparatus. Note that the light source is not illustrated in FIG. 5(A).

In the case where the display apparatus 110 has a function of performing display by a field-sequential method, an image is displayed on the display portion 112 in such a manner that the light sources sequentially emit light, and the light transmittance of the display device 60 is controlled every time the light source emitting light is switched. In other words, the display period is time-divided for each color.

One of the source and the drain of the transistor 41 is electrically connected to one electrode of the capacitor 53 in addition to the one electrode of the capacitor 51, the one electrode of the capacitor 52, and the one electrode of the display device 60. One of a source and a drain of the transistor 43 is electrically connected to the other electrode of the capacitor 53. The other of the source and the drain of the transistor 43 is electrically connected to the wiring 33. A gate of the transistor 43 is electrically connected to the wiring 23. The other connection relationships are similar to those of the pixel 11.

Note that a node that is electrically connected to the one of the source and the drain of the transistor 41, the one electrode of each of the capacitor 51 to the capacitor 53, and the one electrode of the display device 60 is referred to as a node NM2. A node that is electrically connected to the one of the source and the drain of the transistor 43 and the other electrode of the capacitor 53 is referred to as a node NB. Thus, the node NM2 can be regarded as being shared by the memory circuit 15 and the memory circuit 16, and the node NB can be regarded as being provided in the memory circuit 16.

The transistor 43 has a function of a switch, like the transistor 41 and the transistor 42. Conduction and non-conduction of the transistor 43 are controlled on the basis of a signal supplied through the wiring 23. When the transistor 41 is turned on, the image data or the like supplied through the wiring 31 is written to the node NM2 as a charge (a potential), and when the transistor 41 is turned off, the image data or the like written to the node NM2 is retained. When the transistor 43 is turned on, the image data or the like supplied through the wiring 33 is written to the node NB as a charge (a potential), and when the transistor 43 is turned off, the image data or the like written to the node NB is retained.

Here, using a transistor having an extremely low off-state current, such as an OS transistor, as the transistor 41 to the transistor 43 can make the leakage of the charge retained in the node NM2, the node NA, and the node NB extremely low. Accordingly, the potentials of the node NM2, the node NA, and the node NB can be retained for a long time.

Note that a Si transistor may be used as the transistor 43 as well as the transistor 41 and the transistor 42. Alternatively, an OS transistor may be used as one or two of the transistor 41 to the transistor 43, and a Si transistor may be used as the other(s). For example, an OS transistor may be used as the transistor 41 and Si transistors may be used as the transistor 42 and the transistor 43.

Figure 6:
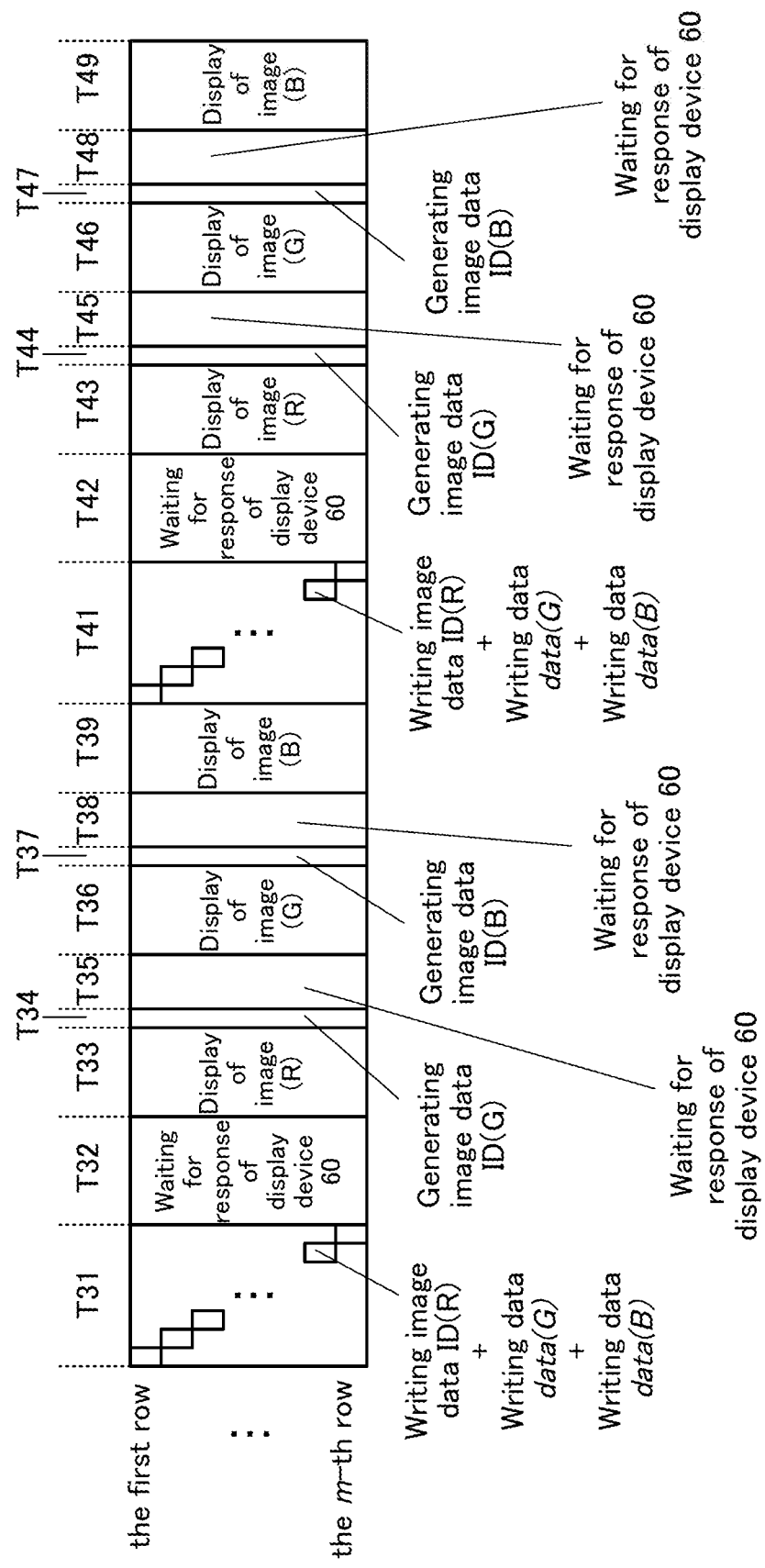
FIG. 6 is a diagram showing an example of an operation method of a display apparatus.

Next, an example of an operation method of the display apparatus 110 in the case where the display apparatus 110 performs display by a field-sequential method will be described. FIG. 6 is a diagram showing an example of the operation method of the display apparatus 110, and shows an operation from a period T31 to a period T49. In FIG. 6, the top portion shows an operation of the pixel 111 in the first row and the bottom portion shows an operation of the pixel 111 in the m-th row.

Figure 7:
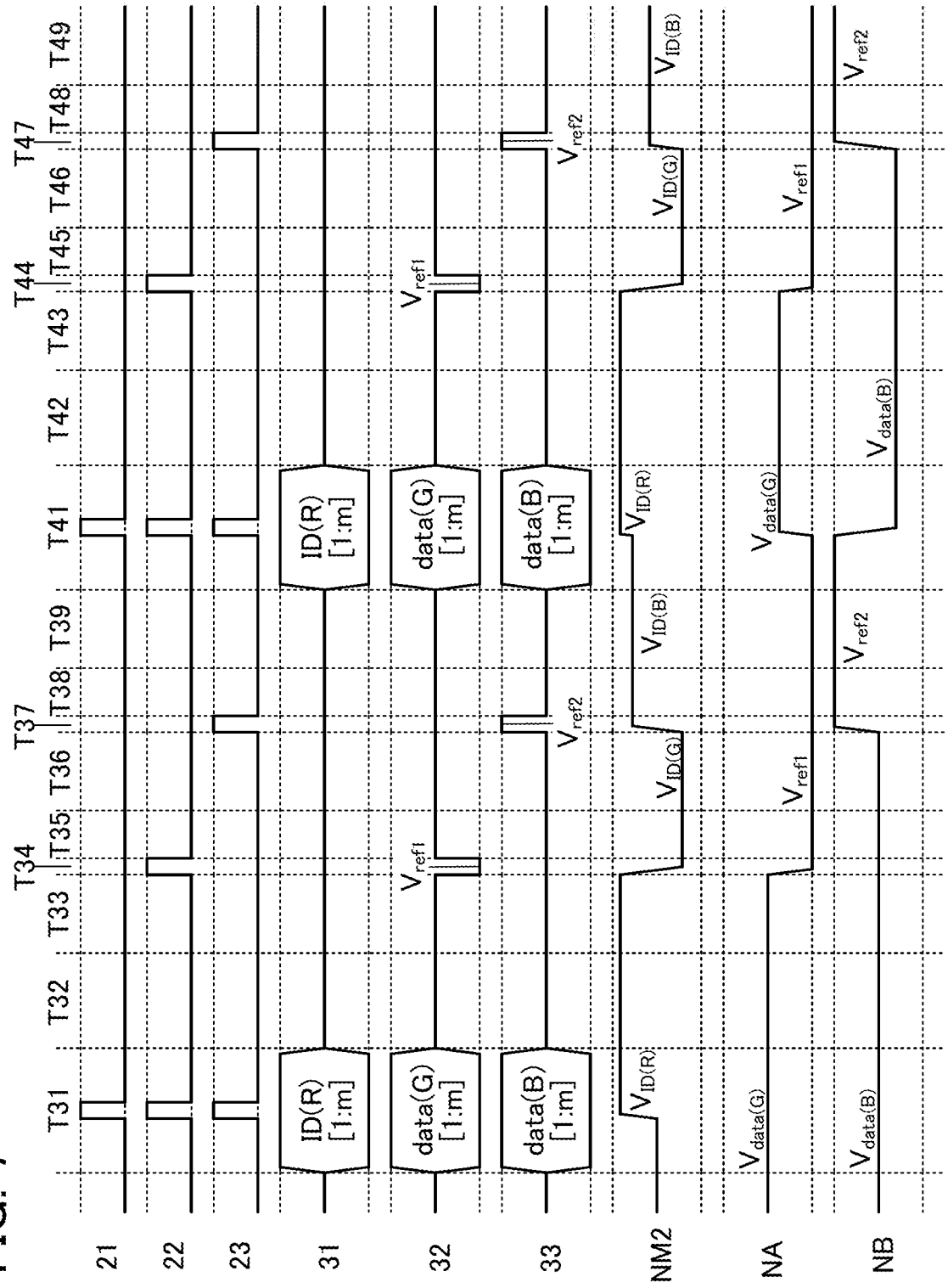
FIG. 7 is a timing chart showing an example of an operation method of a display apparatus.
Figure 9A:
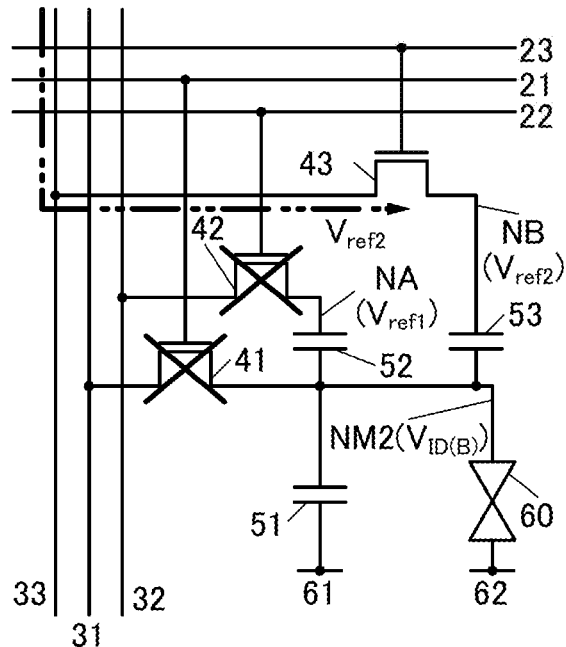
FIGS. 9A and 9B are circuit diagrams showing an example of an operation method of a display apparatus.
Figure 9B:
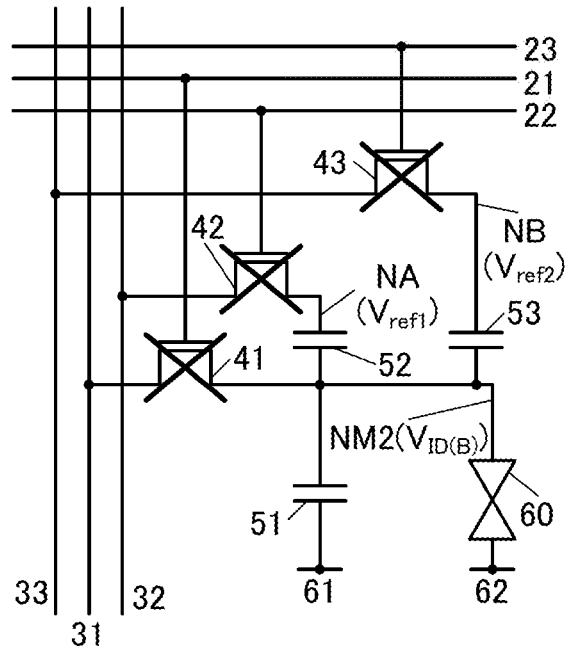

FIG. 7 is a timing chart showing an example of the operation method of the pixel 111 in each period shown in FIG. 6. Note that like FIG. 2 and FIG. 3, FIG. 6 and FIG. 7 show a case where the image (R) that is a red image, the image (G) that is a green image, and the image (B) that is a blue image are displayed in this order, and then the image (R), the image (G), and the image (B) are displayed in this order again.

FIGS. 8(A), 8(B), 8(C), and 8(D) and FIGS. 9(A) and 9(B) are circuit diagrams showing a specific example of the operation method of the pixel 111 from the period T31 to the period T39 of the periods shown in FIG. 6 and FIG. 7. A specific example of the operation method of the pixel 111 in the period T31 is shown in FIG. 8(A), the period T32 and the period T33 in FIG. 8(B), the period T34 in FIG. 8(C), the period T35 and the period T36 in FIG. 8(D), the period T37 in FIG. 9(A), and the period T38 and the period T39 in FIG. 9(B). Note that the operation shown in FIG. 7 to FIG. 9 can be applied to the pixels 111 in any of the first row to the m-th row.

In the period T31, the image data ID(R), the data data(G), and the data data(B) are written to the pixel 111. Specifically, the potentials of the wiring 21 to the wiring 23 are each set to a high potential, the image data ID(R)[i] is supplied to the pixel 111[i] through the wiring 31, the data data(G)[i] is supplied to the pixel 111[i] through the wiring 32, and the data data(B)[i] is supplied to the pixel 111[i] through the wiring 33. Accordingly, the transistor 41 to the transistor 43 are turned on, the potential of the node NM2 becomes a potential $V_{ID(R)}$ that is a potential corresponding to the image data ID(R), the potential of the node NA becomes a potential $V_{data(G)}$ that is a potential corresponding to the data data(G), and the potential of the node NB becomes a potential $V_{data(B)}$ that is a potential corresponding to the data data(B). That is, the image data ID(R), the data data(G), and the data data(B) are written to the pixel 111 from the outside of the pixel 111.

In the pixel 111 to which the image data ID(R), the data data(G), and the data data(B) have written, the potentials of the wiring 21 to the wiring 23 are each set to a low potential. Accordingly, the transistor 41 to the transistor 43 are turned off, the potential $V_{ID(R)}$ is retained in the node NM1, the potential $V_{data(G)}$ is retained in the node NA, and the potential $V_{data(B)}$ is retained in the node NB.

Here, as shown in FIG. 6, the image data ID(R), the data data(G), and the data data(B) are sequentially written row by row to the pixels 111 in the first row to the pixels 111 in the m-th row. That is, the image data ID(R), the data data(G), and the data data(B) are written in a line-sequential manner. Note that the period T31 can be a period from the start of writing of the image data ID(R), the data data(G), and the data data(B) to the pixel 111 in the first row to the end of the writing of the image data ID(R), the data data(G), and the data data(B) to the pixel 111 in the m-th row.

In the period T32, the response of the display device 60 is waited for. Specifically, while the transistor 41 to the transistor 43 are in a non-conduction state, the end of the response of the display device 60 included in each of the pixels 111 in the m-th row is waited for.

In the period T33, the image (R) is displayed on the display portion 12. For example, the red light source provided in the display apparatus 110 is made to emit light, whereby the image (R) corresponding to the image data ID(R) can be displayed. Here, as shown in FIG. 8(B), the potential $V_{ID(R)}$ that is a potential corresponding to the image data ID(R) is applied to the one electrode of the display device 60. The potential $V_{ID(R)}$ does not depend on the data data(G) and the data data(B) that are written to the pixel 111 in the period T31; thus, the image (R) corresponding to the image data ID(R) can be displayed.

In the period T34, the image data ID(G) is generated in the pixel 111 on the basis of the image data ID(R) and the data data(G) that are retained in the pixel 111. Specifically, the potential of the wiring 22 is set to a high potential and the potential of the wiring 32 is set to a potential $V_{refl}$. Accordingly, the transistor 42 is turned on and the potential of the node NA becomes the potential $V_{refl}$. A potential $V_{NM2}$ of the node NM2 can be represented by Formula 1 and Formula 2 when the potential $V_{NM1}$ is replaced with the potential $V_{NM2}$ and the potential $V_{ref}$ is replaced with the potential $V_{refl}$. In other words, when the potential $V_{data(G)}$ that is a potential written to the node NA in the period T31 is set such that the potential $V_{NM2}$ becomes the potential $V_{ID(G)}$ that is a potential corresponding to the image data ID(G), the image data ID(G) is generated in the pixel 111.

Note that the potential $V_{ref1}$ can be a reference potential. For example, all the pixels 111 can be supplied with the same potential $V_{ref1}$. Thus, for example, all the pixels 111 can be supplied with the potential $V_{ref1}$ at the same time. Thus, the image data ID(G) can be generated in the pixels 111 in an area-sequential manner. Thus, the period T34 is shorter than the period T31 in which image data and the like are written in a line-sequential manner.

In the period T35, the response of the display device 60 is waited for. Specifically, the potentials of the wiring 21 to the wiring 23 are each set to a low potential. Accordingly, the transistor 41 to the transistor 43 are turned off, and the potential $V_{ID(G)}$, the potential $V_{ref1}$, and the potential $V_{data(3)}$ are retained in the node NM2, the node NA, and the node NB, respectively. In this state, the end of the response of the display device 60 is waited for.

As described above, in the period T34, the image data ID(G) can be generated in the pixels 111 in an area-sequential manner. Thus, the waiting time for the response of the display device 60 can be shorter than that in the case where image data is written to the pixels 111 in a line-sequential manner as in the period T31. In other words, the period T35 can be shorter than the period T32.

In the period T36, the image (G) is displayed on the display portion 112. For example, the green light source provided in the display apparatus 110 are made to emit light, whereby the image (G) corresponding to the image data ID(G) can be displayed.

In the period T37, the image data ID(B) is generated in the pixel 111 on the basis of the image data ID(G) and the data data(B) that are retained in the pixel 111. Specifically, the potential of the wiring 23 is set to a high potential and the potential of the wiring 33 is set to a potential $V_{ref2}$. Accordingly, the transistor 43 is turned on and the potential of the node NB becomes the potential $V_{ref2}$. The potential $V_{NM2}$ of the node NM2 is represented by the following formula. Here, $C_1$ represents the sum of the capacitance value of the capacitor 51 and the capacitance value of the display device 60, as in Formula 1. In addition, $C_3$ represents the capacitance value of the capacitor 53.

[Formula 3]

$$V_{NM2} = V_{ID(G)} + \frac{C_3}{C_1 + C_3}(-V_{data(B)} + V_{ref2}) \quad (3)$$

When the capacitive coupling coefficient of the node NM2 is 1, the potential $V_{NM2}$ is represented by the following formula.

[Formula 4]

$$V_{NM2} = V_{ID(G)} - V_{data(B)} + V_{ref2} \quad (4)$$

In other words, when the potential $V_{data(B)}$ that is a potential written to the node NB in the period T31 is set such that the potential $V_{NM2}$ becomes the potential $V_{ID(B)}$ that is a potential corresponding to the image data ID(B), the image data ID(B) is generated in the pixel 111.

Here, the potential $V_{ref2}$ can be a reference potential like the potential $V_{ref1}$. Thus, the image data ID(B) can be generated in the pixels 111 in an area-sequential manner. Thus, the period T37 is shorter than the period T31 in which image data and the like are written in a line-sequential manner.

In the period T38, the response of the display device 60 is waited for. Specifically, the potentials of the wiring 21 to the wiring 23 are each set to a low potential. Accordingly, the transistor 41 to the transistor 43 are turned off, and the potential $V_{ID(B)}$, the potential $V_{ref1}$, and the potential $V_{ref2}$ are retained in the node NM2, the node NA, and the node NB, respectively. In this state, the end of the response of the display device 60 is waited for.

As described above, in the period T37, the image data ID(B) can be generated in the pixels 111 in an area-sequential manner. Thus, the waiting time for the response of the display device 60 can be shorter than that in the case where image data is written to the pixels 111 in a line-sequential manner as in the period T31. In other words, the period T38 can be shorter than the period T32.

In the period T39, the image (B) is displayed on the display portion 112. For example, the blue light source provided in the display apparatus 110 is made to emit light, whereby the image (B) corresponding to the image data ID(B) can be displayed.

In a period T41 to a period T49, operations similar to those in the period T31 to the period T39 can be performed. The above is the example of the operation method of the display apparatus 110. Note that the display apparatus 110 can display a one-frame color image from the period T31 to the period T39, and can display a subsequent one-frame color image from the period T41 to the period T49.

In the above operation method, in the period T36 to the period T46, the image (B) can be displayed without writing the image data ID(B) to the pixel 111 from the outside of the pixel 111 after the image (G) is displayed on the display portion 112. Thus, the display apparatus 110 can be operated at high speed.

The operation method shown in FIG. 6 to FIG. 9 can be employed in the case where the display apparatus 110 performs display by a method other than a field-sequential method. In this case, the image data ID(R), the image data ID(G), and the image data ID(B) that are shown in FIG. 6 can each be image data expressing all of a red image, a green image, and a blue image. In addition, in each of the period T33, the period T36, the period T39, the period T43, the period T46, and the period T49, a red image, a green image, and a blue image can be displayed at the same time. In other words, in each of the period T33, the period T36, the period T39, the period T43, the period T46, and the period T49, a one-frame color image can be displayed.

Note that the display apparatus 10 has a structure in which one memory circuit is provided in one pixel and the display apparatus 110 has a structure in which two memory circuits are provided in one pixel; however, the display apparatus of one embodiment of the present invention can have a structure in which three or more memory circuits are provided in one pixel. In this case, the display apparatus of one embodiment of the present invention can be operated at higher speed.

This embodiment can be combined with the other embodiments as appropriate.

EMBODIMENT 2

<Structure Example of Display Apparatus>

Structure examples of the display apparatus of one embodiment of the present invention are described with reference to FIG. 10 to FIG. 14.

Figure 10A:
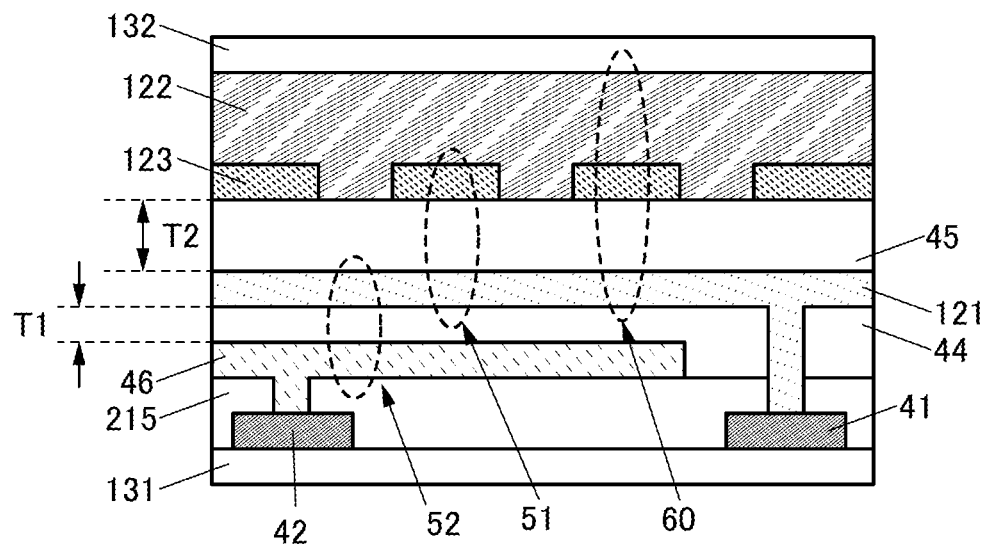
FIGS. 10A and 10B are cross-sectional views each illustrating a structure example of a display apparatus.

FIG. 10(A) illustrates a cross-sectional view of a transmissive liquid crystal display apparatus that is an example of the display apparatus of one embodiment of the present invention. The liquid crystal display apparatus illustrated in FIG. 10(A) includes a substrate 131, the transistor 41, the transistor 42, an insulating layer 215, a conductive layer 46, an insulating layer 44, a pixel electrode 121, an insulating layer 45, a common electrode 123, a liquid crystal layer 122, and a substrate 132.

The transistor 41 and the transistor 42 are positioned over the substrate 131. The insulating layer 215 is positioned over the transistor 41 and the transistor 42. The conductive layer 46 is positioned over the insulating layer 215. The insulating layer 44 is positioned over the transistor 41, the transistor 42, the insulating layer 215, and the conductive layer 46. The pixel electrode 121 is positioned over the insulating layer 44. The insulating layer 45 is positioned over the pixel electrode 121. The common electrode 123 is positioned over the insulating layer 45. The liquid crystal layer 122 is positioned over the common electrode 123. The common electrode 123 includes a region overlapping with the conductive layer 46 with the pixel electrode 121 therebetween. The pixel electrode 121 is electrically connected to the source or the drain of the transistor 41. The conductive layer 46 is electrically connected to the source or the drain of the transistor 42. The conductive layer 46, the pixel electrode 121, and the common electrode 123 each have a function of transmitting visible light.

The liquid crystal display apparatus of this embodiment, in which the pixel electrode 121 and the common electrode 123 are stacked with the insulating layer 45 therebetween, operates in an FFS (Fringe Field Switching) mode. The pixel electrode 121, the liquid crystal layer 122, and the common electrode 123 can function as the display device 60.

The pixel electrode 121, the insulating layer 45, and the common electrode 123 can function as one capacitor 51. The conductive layer 46, the insulating layer 44, and the pixel electrode 121 can function as one capacitor 52. Thus, the liquid crystal display apparatus of this embodiment includes two capacitors in a pixel. Note that the liquid crystal display apparatus of this embodiment may include three or more capacitors in a pixel.

Both of the two capacitors are formed using a material transmitting visible light and include a region where they overlap with each other. Accordingly, the pixel has a high aperture ratio and can include a plurality of storage capacitors.

When the aperture ratio of the transmissive liquid crystal display apparatus (also referred to as the aperture ratio of a pixel) is increased, the liquid crystal display apparatus can have higher resolution. Furthermore, a higher aperture ratio increases the light extraction efficiency. Thus, the power consumption of the liquid crystal display apparatus can be reduced.

The capacitance of the capacitor 52 is preferably larger than the capacitance of the capacitor 51. For example, the area of a region where the pixel electrode 121 and the conductive layer 46 overlap with each other is preferably larger than the area of a region where the pixel electrode 121 and the common electrode 123 overlap with each other. It is also preferable that the thickness T1 of the insulating layer 44 positioned between the conductive layer 46 and the pixel electrode 121 be thinner than the thickness T2 of the insulating layer 45 positioned between the pixel electrode 121 and the common electrode 123.

Figure 10B:
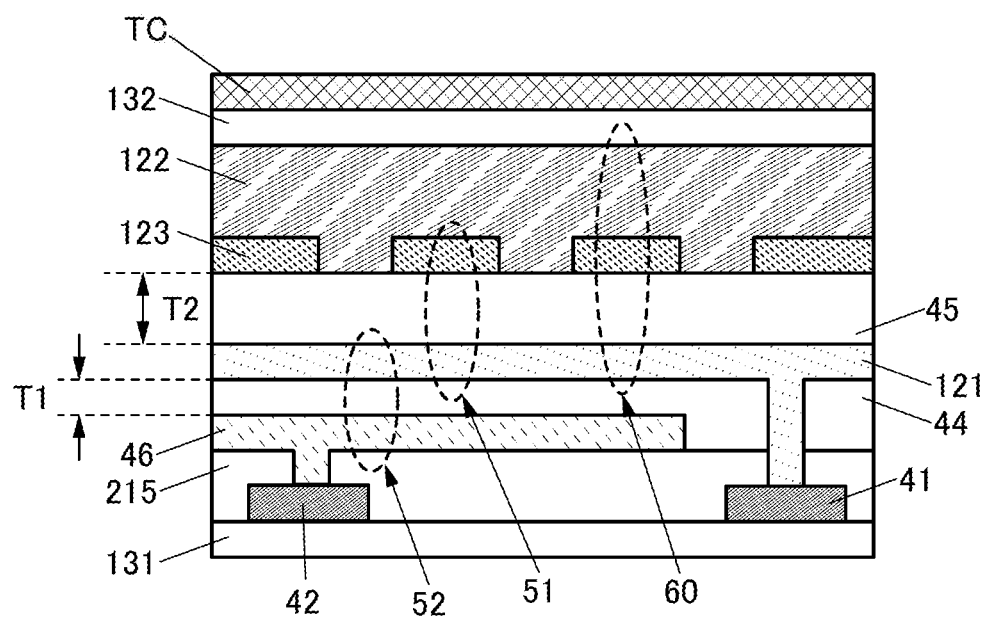

The structures of the display apparatuses of this embodiment can be used also for a touch panel. FIG. 10(B) illustrates an example of the display apparatus illustrated in FIG. 10(A) including a touch sensor TC. The sensitivity of the touch sensor TC can be increased by providing the touch sensor TC on a position close to the display surface of the display apparatus.

There is no limitation on a detection element (also referred to as a sensor element) included in the touch panel of one embodiment of the present invention. A variety of sensors such as a finger or a stylus that can sense proximity or touch of a sensing target can be used as the sensor element.

For example, a variety of types such as a capacitive type, a resistive type, a surface acoustic wave type, an infrared type, an optical type, and a pressure-sensitive type can be used as the sensor type.

Examples of the capacitive sensor type include a surface capacitive sensor type and a projected capacitive sensor type. Examples of the projected capacitive sensor type include a self-capacitive sensor type and a mutual capacitive sensor type. The use of a mutual capacitive sensor type is preferable because multiple points can be sensed simultaneously.

The touch panel of one embodiment of the present invention can have any of a variety of structures, including a structure in which a display apparatus and a sensor element that are separately formed are attached to each other and a structure in which an electrode and the like included in a sensor element are provided on one or both of a substrate supporting a display device and a counter substrate.

<<Top Surface Layout of Pixel>>

Figure 11A:
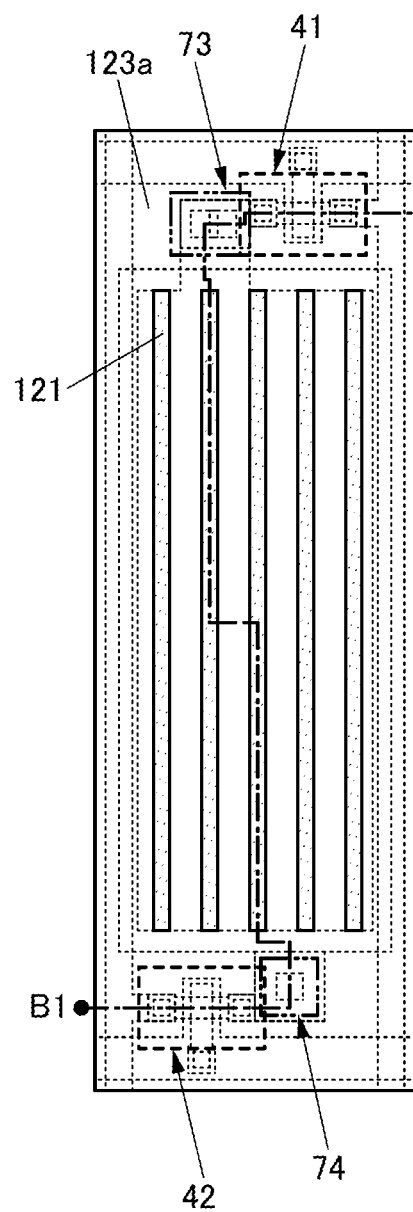
FIGS. 11A-11C are top views illustrating a structure example of a pixel.
Figure 11B:
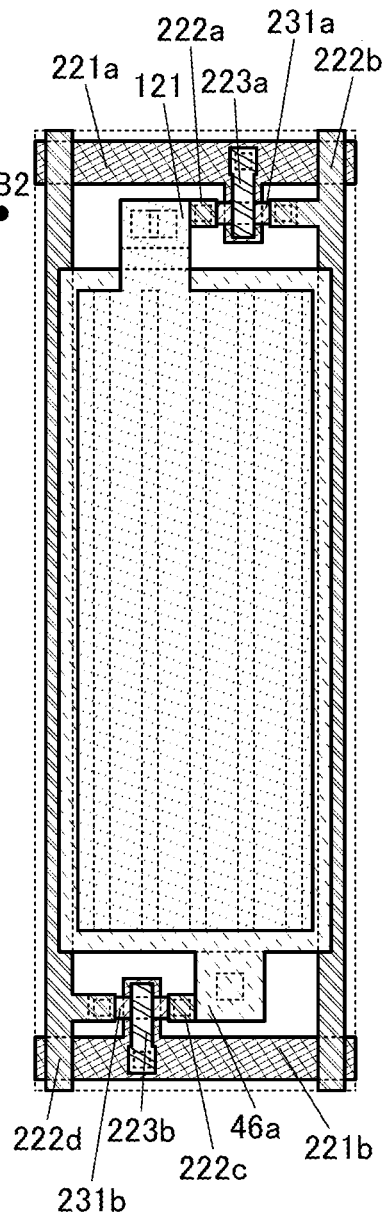
Figure 11C:
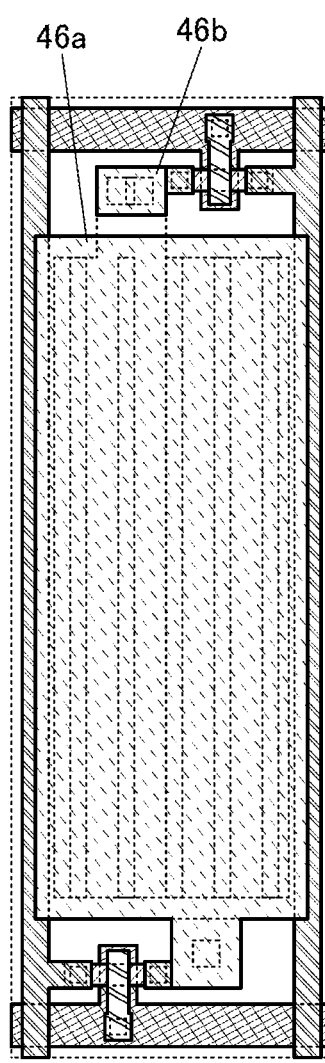

FIGS. 11(A) to 11(C) illustrate top views of a pixel. FIG. 11(A) is a top view of a stacked-layer structure from a gate 221a and a gate 221b to a common electrode 123a, which is seen from the common electrode 123a side. FIG. 11(B) is a top view of the stacked-layer structure of FIG. 11(A) except the common electrode 123a, and FIG. 11(C) is a top view of the stacked-layer structure of FIG. 11(A) except the common electrode 123a and the pixel electrode 121.

The pixel includes a connection portion 73 and a connection portion 74. In the connection portion 73, the pixel electrode 121 is electrically connected to the transistor 41. Specifically, a conductive layer 222a functioning as the source or the drain of the transistor 41 is in contact with a conductive layer 46b, and the conductive layer 46b is in contact with the pixel electrode 121. In the connection portion 74, a conductive layer 46a is electrically connected to the transistor 42. Specifically, the conductive layer 46a is in contact with a conductive layer 222c functioning as the source or the drain of the transistor 42.

<<Cross-Sectional Structure of Display Apparatus>>

Figure 12:
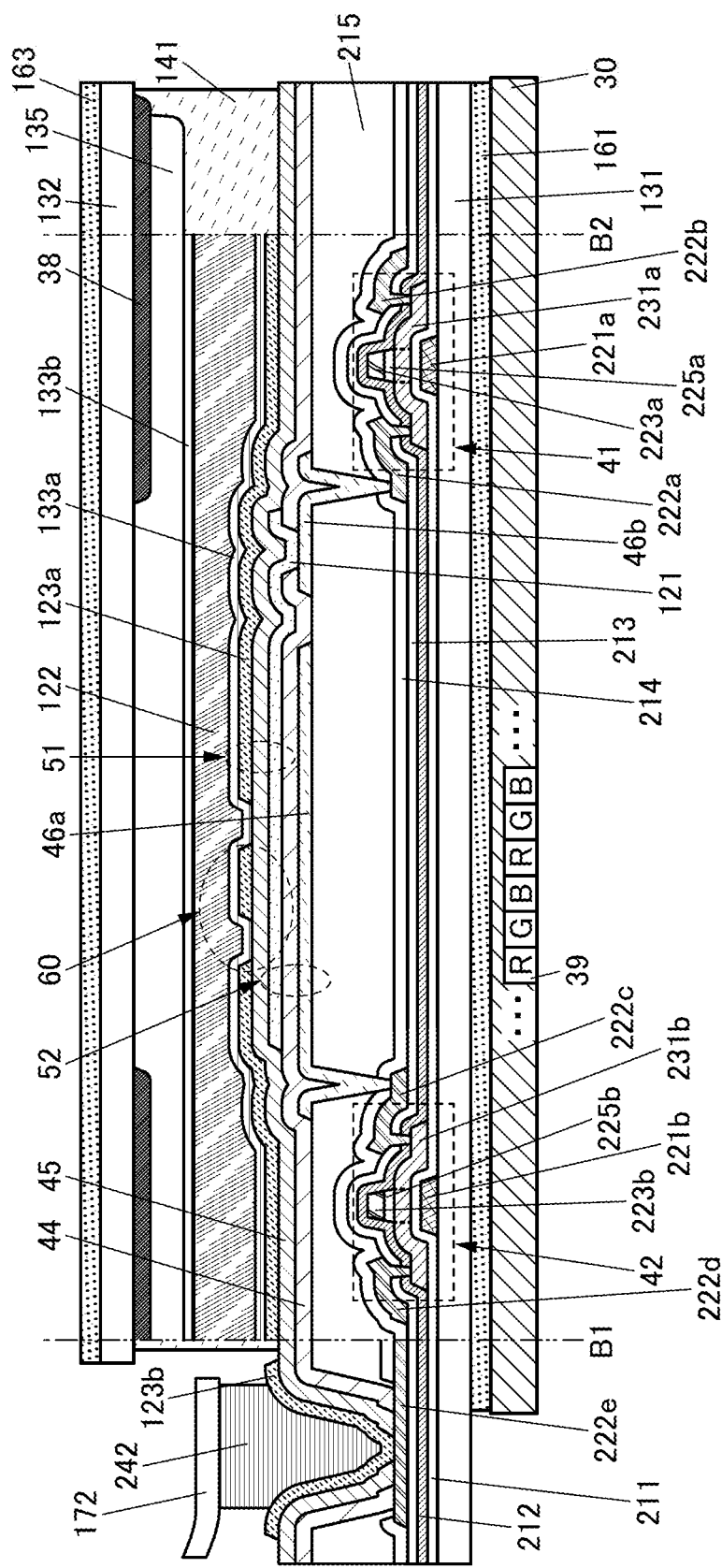
FIG. 12 is a cross-sectional view illustrating a structure example of a display apparatus.

FIG. 12 illustrates a cross-sectional view of a display apparatus. Note that the cross-sectional structure of the pixel corresponds to the cross-sectional view taken along dashed-dotted line B1-B2 shown in FIG. 11(A).

The display apparatus illustrated in FIG. 12 includes the substrate 131, the substrate 132, the transistor 41, the conductive layer 46a, the conductive layer 46b, the insulating layer 44, the insulating layer 45, the pixel electrode 121, the liquid crystal layer 122, the common electrode 123a, the conductive layer 123b, a conductive layer 222e, an alignment film 133a, an alignment film 133b, an adhesive layer 141, an overcoat 135, a light-blocking layer 38, a polarizing plate 161, a polarizing plate 163, a backlight unit 30, an FPC 172, and the like.

The transistor 41 and the transistor 42 are positioned over the substrate 131. The transistor 41 includes the gate 221a, a gate insulating layer 211, a semiconductor layer 231a, a conductive layer 222a, a conductive layer 222b, an insulating layer 212, an insulating layer 213, a gate insulating layer 225a, and a gate 223a. The transistor 42 includes the gate 221b, the gate insulating layer 211, a semiconductor layer 231b, the conductive layer 222c, a conductive layer 222d, the insulating layer 212, the insulating layer 213, a gate insulating layer 225b, and a gate 223b.

The transistor 41 and the transistor 42 that are illustrated in FIG. 12 each include a gate above and below the channel. It is preferable that the two gates be electrically connected to each other. A transistor having a structure in which two gates are electrically connected to each other can have a higher field-effect mobility and thus have higher on-state current than other transistors. Consequently, a circuit capable of high-speed operation can be fabricated. Furthermore, the area occupied by a circuit portion can be reduced. The use of the transistor having a high on-state current can reduce signal delay in each wiring and can suppress display unevenness even in a display apparatus in which the number of wirings is increased because of an increase in size or an increase in resolution. In addition, the area occupied by a circuit portion can be reduced, whereby the bezel of the display apparatus can be narrowed. Moreover, with the use of such a structure, a highly reliable transistor can be achieved.

The semiconductor layer 231 includes a pair of low-resistance regions and a channel formation region sandwiched between the pair of low-resistance regions.

The channel formation region overlaps with the gate 221 with the gate insulating layer 211 therebetween and overlaps with the gate 223 with the gate insulating layer 225 therebetween.

In this specification and the like, the semiconductor layer 231 refers to one or both of the semiconductor layer 231a and the semiconductor layer 231b. In addition, the gate 221 refers to one or both of the gate 221a and the gate 221b, and the gate 223 refers to one or both of the gate 223a and the gate 223b. Furthermore, the gate insulating layer 225 refers to one or both of the gate insulating layer 225a and the gate insulating layer 225b.

Here, an example in which a metal oxide is used for the semiconductor layer 231 is described.

The gate insulating layer 211 and the gate insulating layer 225 in contact with the channel formation region are preferably oxide insulating layers. Note that in the case where the gate insulating layer 211 or the gate insulating layer 225 has a stacked-layer structure, it is preferable that at least a layer in contact with the channel formation region be the oxide insulating layer. Accordingly, generation of oxygen vacancies in the channel formation region can be suppressed, leading to higher reliability of the transistor.

One or both of the insulating layer 213 and the insulating layer 214 are preferably a nitride insulating layer. As a result, entry of impurities into the semiconductor layer 231 can be suppressed, leading to higher reliability of the transistor.

The insulating layer 215 preferably has a planarization function, and is preferably an organic insulating layer, for example. Note that one or both of the insulating layer 214 and the insulating layer 215 are not necessarily formed.

The resistivity of the low-resistance regions is lower than that of the channel formation region. The low-resistance regions are regions of the semiconductor layer 231 that are in contact with the insulating layer 212. Here, the insulating layer 212 preferably contains nitrogen or hydrogen. Accordingly, nitrogen or hydrogen in the insulating layer 212 enters the low-resistance regions to increase the carrier concentration of the low-resistance regions. Alternatively, the low-resistance regions may be formed by the addition of an impurity using the gate 223 as a mask. Examples of the impurity include hydrogen, helium, neon, argon, fluorine, nitrogen, phosphorus, arsenic, antimony, boron, and aluminum, and the impurity can be added by an ion implantation method or an ion doping method. Other than the above impurities, for example, indium, which is a constituent element of the semiconductor layer 231, may be added to form the low-resistance regions. The concentration of indium in the low-resistance region is higher than that in the channel formation region in some cases when indium is added.

Furthermore, after the gate insulating layer 225 and the gate 223 are formed, a first layer is formed to be in contact with part of a region of the semiconductor layer 231 and heat treatment is performed, whereby the resistance of the region can be reduced and the low-resistance regions can be formed.

For the first layer, a film containing at least one of metal elements such as aluminum, titanium, tantalum, tungsten, chromium, and ruthenium can be used. It is particularly preferable that at least one of aluminum, titanium, tantalum, and tungsten be contained. Alternatively, it is preferable to use a nitride containing at least one of these metal elements or an oxide containing at least one of these metal elements. In particular, it is preferable to use a metal film such as a tungsten film or a titanium film, a nitride film such as an aluminum titanium nitride film, a titanium nitride film, or an aluminum nitride film, or an oxide film such as an aluminum titanium oxide film, for example.

The thickness of the first layer can range, for example, from 0.5 nm to 20 nm, preferably from 0.5 nm to 15 nm, further preferably from 0.5 nm to 10 nm, still further preferably 1 nm to 6 nm. Typically, the thickness can be approximately 5 nm or approximately 2 nm. With such a thin first layer, the resistance of the semiconductor layer 231 can be sufficiently lowered.

It is important that the low-resistance regions are regions having a higher carrier density than the channel formation region. For example, the low-resistance region can be a region having a higher hydrogen content than the channel formation region, or a region containing more oxygen vacancies than the channel formation region. When bonded to a hydrogen atom, an oxygen vacancy in the oxide semiconductor serves as a carrier generation source.

The heat treatment is performed while the first layer is provided in contact with part of a region of the semiconductor layer 231, whereby oxygen in the region is absorbed into the first layer, and thus, a large number of oxygen vacancies can be generated in the region. Thus, the low-resistance regions can be regions with extremely low resistance.

The low-resistance regions formed in the above manner have a feature in that its resistance is not likely to be increased by subsequent process. There is no possibility that the conductivity of low-resistance regions is impaired by heat treatment in an atmosphere containing oxygen or by deposition process in an atmosphere containing oxygen, for example; thus, a transistor with favorable electrical characteristics and high reliability can be achieved.

In the case where the first layer that has undergone the heat treatment has conductivity, the first layer is preferably removed after the heat treatment. In contrast, when the first layer has insulating properties, the first layer can function as a protective insulating film when remaining.

The conductive layer 46b is positioned over the insulating layer 215, the insulating layer 44 is positioned over the conductive layer 46b, and the pixel electrode 121 is positioned over the insulating layer 44. The pixel electrode 121 is electrically connected to the conductive layer 222a. Specifically, the conductive layer 222a is connected to the conductive layer 46b, and the conductive layer 46b is connected to the pixel electrode 121.

The conductive layer 46a is positioned over the insulating layer 215. The conductive layer 46a is electrically connected to the conductive layer 222c. Specifically, the conductive layer 46a is in contact with the conductive layer 222c through an opening provided in the insulating layer 214 and the insulating layer 215.

The substrate 131 and the substrate 132 are attached to each other with the adhesive layer 141.

The FPC 172 is electrically connected to the conductive layer 222e. Specifically, the FPC 172 is in contact with a connector 242, the connector 242 is in contact with the conductive layer 123b, and the conductive layer 123b is in contact with the conductive layer 222e. The conductive layer 123b is formed over the insulating layer 45, and the conductive layer 222e is formed over the insulating layer 214. The conductive layer 123b can be formed using the same process and the same material as those for the common electrode 123a. The conductive layer 222e can be formed using the same process and the same material as those for the conductive layer 222a to the conductive layer 222d.

The pixel electrode 121, the insulating layer 45, and the common electrode 123a can function as one capacitor 51. The conductive layer 46a, the insulating layer 44, and the pixel electrode 121 can function as one capacitor 52. Thus, the display apparatus of one embodiment of the present invention includes two capacitors in one pixel, for example. As a result, the storage capacity of the pixel can be increased.

The two capacitors are formed using a material transmitting visible light and include a region where they overlap with each other. Accordingly, the pixel can achieve both high aperture ratio and high storage capacity.

The capacitance of the capacitor 52 is preferably larger than the capacitance of the capacitor 51. Therefore, the area of a region where the pixel electrode 121 and the conductive layer 46a overlap with each other is preferably greater than the area of a region where the pixel electrode 121 and the common electrode 123a overlap with each other. It is also preferable that the thickness of the insulating layer 44 positioned between the conductive layer 46a and the pixel electrode 121 be thinner than the thickness of the insulating layer 45 positioned between the pixel electrode 121 and the common electrode 123a.

Although FIG. 12 illustrates an example in which both the transistor 41 and the transistor 42 have a back gate (the gate 223), one or both of the transistor 41 and the transistor 42 do not necessarily have a back gate.

Figure 13:
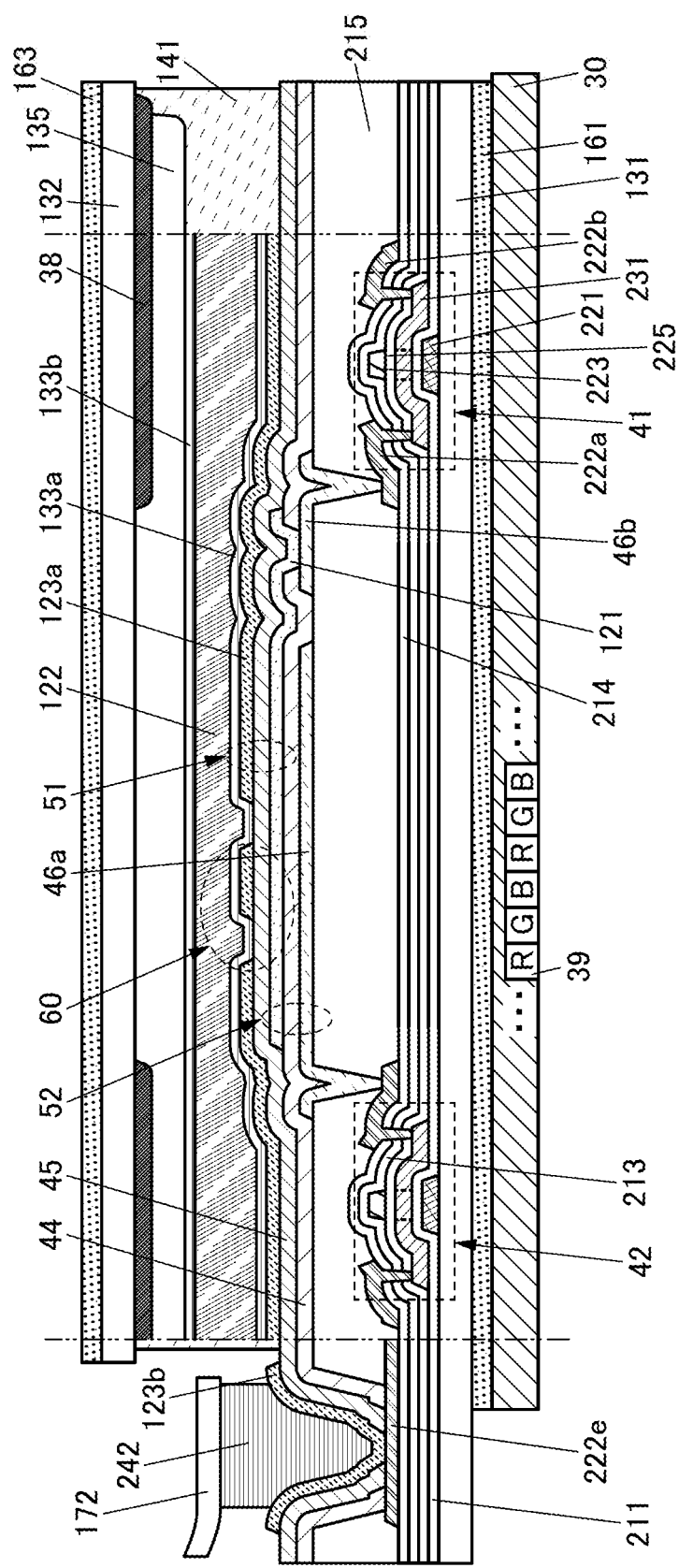
FIG. 13 is a cross-sectional view illustrating a structure example of a display apparatus.

In addition, although FIG. 12 illustrates an example in which the gate insulating layer 225 is formed only over the channel formation region and does not overlap with the low-resistance region, the gate insulating layer 225 may overlap with at least part of the low-resistance region. FIG. 13 illustrates an example in which the gate insulating layer 225 is formed to be in contact with the low-resistance region and the gate insulating layer 211. The gate insulating layer 225 illustrated in FIG. 13 has an advantage in that the step of processing the gate insulating layer 225 using the gate 223 as a mask is not necessary, the step height of a surface on which the insulating layer 214 is formed can be lowered, and the like.

Figure 14:
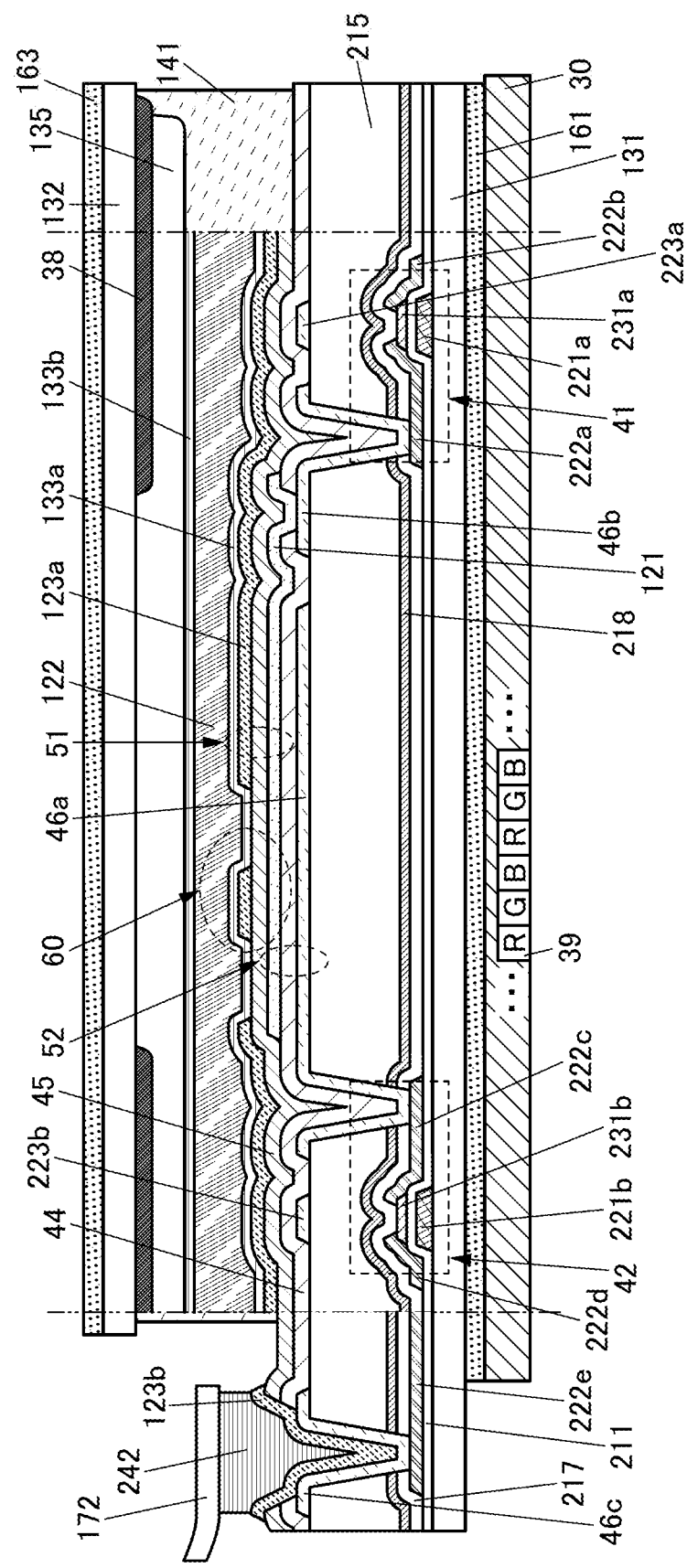
FIG. 14 is a cross-sectional view illustrating a structure example of a display apparatus.

The display apparatus illustrated in FIG. 14 is different from those in FIG. 12 and FIG. 13 in the structure of the transistor 41 and the transistor 42.

The transistor 41 illustrated in FIG. 14 includes the gate 221a, the gate insulating layer 211, the semiconductor layer 231a, the conductive layer 222a, the conductive layer 222b, the insulating layer 217, the insulating layer 218, the insulating layer 215, and the gate 223a. The transistor 42 includes the gate 221b, the gate insulating layer 211, the semiconductor layer 231b, the conductive layer 222c, the conductive layer 222d, the insulating layer 217, the insulating layer 218, the insulating layer 215, and the gate 223b. One of the conductive layer 222a and the conductive layer 222b functions as a source and the other functions as a drain. The insulating layer 217, the insulating layer 218, and the insulating layer 215 function as gate insulating layers.

Here, an example in which a metal oxide is used for the semiconductor layer 231 is described.

The gate insulating layer 211 and the insulating layer 217 in contact with the semiconductor layer 231 are preferably oxide insulating layers. In the case where the gate insulating layer 211 or the insulating layer 217 has a stacked-layer structure, at least a layer in contact with the semiconductor layer 231 is preferably an oxide insulating layer. Accordingly, generation of oxygen vacancies in the semiconductor layer 231 can be suppressed, and thus, the reliability of the transistor can be improved.

The insulating layer 218 is preferably a nitride insulating layer. As a result, entry of impurities into the semiconductor layer 231 can be suppressed, and the reliability of the transistor can be improved.

The insulating layer 215 preferably has a planarization function, and is preferably an organic insulating layer, for example. Note that the insulating layer 215 is not necessarily formed, and the conductive layer 46a may be formed over and in contact with the insulating layer 218.

The conductive layer 46b is positioned over the insulating layer 215, the insulating layer 44 is positioned over the conductive layer 46b, and the pixel electrode 121 is positioned over the insulating layer 44. The pixel electrode 121 is electrically connected to the conductive layer 222a. Specifically, the conductive layer 222a is connected to the conductive layer 46b, and the conductive layer 46b is connected to the pixel electrode 121.

The conductive layer 46a is positioned over the insulating layer 215. The insulating layer 44 and the insulating layer 45 are positioned over the conductive layer 46a. The common electrode 123a is positioned over the insulating layer 45.

<<Materials of Components>>

Next, the details of materials and the like that can be used for components of the display apparatus of this embodiment will be described.

There are no strict limitation on the material for a substrate included in the display apparatus; a variety of substrates can be used. For example, a glass substrate, a quartz substrate, a sapphire substrate, a semiconductor substrate, a ceramic substrate, a metal substrate, a plastic substrate, or the like can be used.

The use of a thin substrate can reduce the weight and thickness of the display apparatus. Furthermore, the use of a substrate that is thin enough to have flexibility allows a flexible display apparatus to be achieved.

Liquid crystal materials include a positive liquid crystal material with a positive dielectric anisotropy ($\Delta\varepsilon$) and a negative liquid crystal material with a negative dielectric anisotropy. Either of the materials can be used in one embodiment of the present invention, and an optimal liquid crystal material can be used according to the employed mode and design.

The display apparatus of this embodiment can employ a liquid crystal device having a variety of modes. For example, other than the above-described FFS mode, an IPS mode, a TN mode, an ASM (Axially Symmetric aligned Micro-cell) mode, an OCB (Optically Compensated Birefringence) mode, an FLC (Ferroelectric Liquid Crystal) mode, an AFLC (AntiFerroelectric Liquid Crystal) mode, an ECB (Electrically Controlled Birefringence) mode, a VA-IPS mode, a guest-host mode, or the like can be used for a liquid crystal device.

Note that the liquid crystal device is a device that controls the transmission or non-transmission of light utilizing an optical modulation action of a liquid crystal. The optical modulation action of the liquid crystal is controlled by an electric field applied to the liquid crystal (including a horizontal electric field, a vertical electric field, and an oblique electric field). As the liquid crystal used for the liquid crystal device, thermotropic liquid crystal, low-molecular liquid crystal, high-molecular liquid crystal, polymer dispersed liquid crystal (PDLC), ferroelectric liquid crystal, anti-ferroelectric liquid crystal, or the like can be used. Such a liquid crystal material exhibits a cholesteric phase, a smectic phase, a cubic phase, a chiral nematic phase, an isotropic phase, or the like depending on conditions.

As described above, in the display apparatus of this embodiment, a liquid crystal device can be driven with application of high voltage; therefore, a liquid crystal exhibiting a blue phase may be used. The blue phase is one of the liquid crystal phases, which appears just before a cholesteric phase changes into an isotropic phase when the temperature of a cholesteric liquid crystal is increased. Since the blue phase appears only in a narrow temperature range, a liquid crystal composition in which a chiral material is mixed to account for 5 weight % or more is used for the liquid crystal layer in order to improve the temperature range. The liquid crystal composition that contains liquid crystal exhibiting a blue phase and a chiral material has a short response speed and exhibits optical isotropy. In addition, the liquid crystal composition containing a liquid crystal exhibiting a blue phase and a chiral material does not need alignment treatment and has small viewing angle dependence. Since an alignment film does not need to be provided and rubbing treatment is unnecessary, electrostatic discharge damage caused by the rubbing treatment can be prevented and defects or damage of the display panel in the manufacturing process can be reduced.

Since the display apparatus of this embodiment is a transmissive liquid crystal display apparatus, a visible-light-transmitting conductive material is used for both of a pair of electrodes (the pixel electrode 121 and the common electrode 123a). In addition, when the conductive layer 46b is formed using a conductive material that transmits visible light, a decrease in aperture ratio in a pixel can be suppressed even when the capacitor 52 is provided. Note that a silicon nitride film is preferable as the insulating layer 44 and the insulating layer 45 functioning as a dielectric of the capacitor.

For example, a material containing one or more kinds selected from indium (In), zinc (Zn), and tin (Sn) is preferably used as the conductive material transmitting visible light. Specifically, indium oxide, indium tin oxide (ITO), indium zinc oxide, indium oxide containing tungsten oxide, indium zinc oxide containing tungsten oxide, indium oxide containing titanium oxide, indium tin oxide containing titanium oxide, indium tin oxide containing silicon oxide (ITSO), zinc oxide, zinc oxide containing gallium, and the like are given. Note that a film containing graphene can be used as well. The film including graphene can be formed, for example, by reducing a film including graphene oxide.

A conductive film that transmits visible light can be formed using an oxide semiconductor (hereinafter also referred to as an oxide conductive layer). For example, the oxide conductive layer preferably includes indium and further preferably includes an In-M-Zn oxide (M is Al, Ti, Ga, Y, Zr, La, Ce, Nd, Sn, or Hf).

An oxide semiconductor is a semiconductor material whose resistance can be controlled by oxygen vacancies in the film and/or the concentration of impurities such as hydrogen and water in the film. Thus, the resistivity of the oxide conductive layer can be controlled by selecting treatment for increasing oxygen vacancies and/or impurity concentration or treatment for reducing oxygen vacancies and/or impurity concentration, for an oxide semiconductor layer.

Note that such an oxide conductive layer formed using an oxide semiconductor can also be referred to as an oxide semiconductor layer having a high carrier density and a low resistance, an oxide semiconductor layer having conductivity, or an oxide semiconductor layer having high conductivity.

A transistor included in the display apparatus of this embodiment may have either a top-gate structure or a bottom-gate structure. Gate electrodes may be provided above and below a channel. A semiconductor material used in the transistor is not particularly limited, and examples of the semiconductor material include an oxide semiconductor, silicon, and germanium.

There is no particular limitation on the crystallinity of a semiconductor material used for the transistors, and an amorphous semiconductor or a semiconductor having crystallinity (a microcrystalline semiconductor, a polycrystalline semiconductor, a single crystal semiconductor, or a semiconductor partly including crystal regions) may be used. It is preferable that a semiconductor having crystallinity be used, in which case deterioration of the transistor characteristics can be suppressed.

For example, a Group 14 element, a compound semiconductor, or an oxide semiconductor can be used for the semiconductor layer. Typically, a semiconductor containing silicon, a semiconductor containing gallium arsenide, an oxide semiconductor containing indium, or the like can be used for the semiconductor layer.

An oxide semiconductor is preferably used as a semiconductor in which a channel of the transistor is formed. In particular, an oxide semiconductor having a wider band gap than silicon is preferably used. Using a semiconductor material having a wider band gap and a lower carrier density than silicon is preferable because the off-state current of a transistor can be reduced.

The use of an oxide semiconductor makes it possible to provide a highly reliable transistor in which a change in the electrical characteristics is reduced.

Charge accumulated in a capacitor through the transistor can be retained for a long time because of the low off-state current. The use of such a transistor in a pixel allows a driver circuit to stop with the gray level of a displayed image maintained. As a result, the display apparatus with significantly reduced power consumption can be obtained.

The transistors preferably contain an oxide semiconductor layer that is highly purified to inhibit the formation of oxygen vacancies. This can reduce the current in an off state (off-state current) of the transistors. Accordingly, the holding time of an electrical signal such as an image signal can be made longer, and a writing interval can also be set longer in an on state. Accordingly, the frequency of refresh operation can be reduced, which leads to an effect of suppressing power consumption.

The transistor using the oxide semiconductor can have relatively high field-effect mobility and thus can operate at high speed. With the use of such transistors that are capable of high-speed operation in the display apparatus, the transistor in the display portion and the transistors in the driver circuit portion can be formed over the same substrate. That is, a semiconductor device separately formed with a silicon wafer or the like does not need to be used as the driver circuit, which enables a reduction in the number of components of the display apparatus. In addition, with the use of the transistor that can operate at high speed also in the display portion, a high-quality image can be provided.

An organic insulating material or an inorganic insulating material can be used as an insulating material that can be used for the insulating layers, the overcoat, or the like included in the display apparatus. Examples of the organic insulating material include an acrylic resin, an epoxy resin, a polyimide resin, a polyamide resin, a polyimide-amide resin, a siloxane resin, a benzocyclobutene-based resin, and a phenol resin. As inorganic insulating layers, a silicon oxide film, a silicon oxynitride film, a silicon nitride oxide film, a silicon nitride film, an aluminum oxide film, a hafnium oxide film, an yttrium oxide film, a zirconium oxide film, a gallium oxide film, a tantalum oxide film, a magnesium oxide film, a lanthanum oxide film, a cerium oxide film, a neodymium oxide film, and the like can be given.

For the conductive layer for the gate, the source, and the drain of the transistor, various wirings and electrodes of the display apparatus, and the like, a single-layer structure or a stacked-layer structure using any of metals such as aluminum, titanium, chromium, nickel, copper, yttrium, zirconium, molybdenum, silver, tantalum, and tungsten, or an alloy containing any of these metals as its main component can be used. For example, a two-layer structure in which a titanium film is stacked over an aluminum film; a two-layer structure in which a titanium film is stacked over a tungsten film; a two-layer structure in which a copper film is stacked over a molybdenum film; a two-layer structure in which a copper film is stacked over an alloy film containing molybdenum and tungsten; a two-layer structure in which a copper film is stacked over an alloy film containing copper, magnesium, and aluminum; a three-layer structure in which a titanium film or a titanium nitride film, an aluminum film or a copper film, and a titanium film or a titanium nitride film are stacked in this order; a three-layer structure in which a molybdenum film or a molybdenum nitride film, an aluminum film or a copper film, and a molybdenum film or a molybdenum nitride film are stacked in this order; or the like can be employed. For example, in the case where the conductive layer has a three-layer structure, it is preferable that each of the first layer and the third layer be a film formed of titanium, titanium nitride, molybdenum, tungsten, an alloy containing molybdenum and tungsten, an alloy containing molybdenum and zirconium, or molybdenum nitride, and that the second layer be a film formed of a low-resistance material such as copper, aluminum, gold, silver, or an alloy containing copper and manganese. Note that light-transmitting conductive materials such as ITO, indium oxide containing tungsten oxide, indium zinc oxide containing tungsten oxide, indium oxide containing titanium oxide, indium tin oxide containing titanium oxide, indium zinc oxide, or ITSO may be used. Note that an oxide conductive layer may be formed by controlling the resistivity of an oxide semiconductor.

A curable resin such as a heat-curable resin, a photocurable resin, or a two-component-mixture-type curable resin can be used as the adhesive layer 141. For example, an acrylic resin, a urethane resin, an epoxy resin, or a siloxane resin can be used.

As the connector 242, for example, an anisotropic conductive film (ACF) or an anisotropic conductive paste (ACP) can be used.

As the backlight unit 30, a direct-below backlight, an edge-light type backlight, or the like can be used. As a light source, an LED (Light Emitting Diode), an organic EL (Electroluminescence) element, or the like can be used. The backlight unit 30 is provided with light sources 39, and can have a structure in which the light source 39 emitting red light, the light source 39 emitting green light, and the light source 39 emitting blue light are provided, for example.

The thin films included in the display apparatus (the insulating film, the semiconductor film, the conductive film, and the like) can be formed by a sputtering method, a chemical vapor deposition (CVD) method, a vacuum evaporation method, a pulsed laser deposition (PLD) method, an atomic layer deposition (ALD) method, or the like. As examples of the CVD method, a plasma-enhanced chemical vapor deposition (PECVD) method, a thermal CVD method, and the like can be given. As an example of the thermal CVD method, a metal organic chemical vapor deposition (MOCVD: Metal Organic CVD) method can be given.

The thin films included in the display apparatus (the insulating film, the semiconductor film, the conductive film, and the like) can each be formed by a method such as spin coating, dipping, spray coating, inkjet printing, dispensing, screen printing, offset printing, a doctor knife, slit coating, roll coating, curtain coating, or knife coating.

The thin films included in the display apparatus can be processed using a photolithography method or the like. Alternatively, island-shaped thin films may be formed by a film formation method using a blocking mask. Alternatively, the thin films may be processed by a nano-imprinting method, a sandblasting method, a lift-off method, or the like. Examples of the photolithography method include a method in which a resist mask is formed over a thin film to be processed, the thin film is processed by etching or the like, and the resist mask is removed, and a method in which a photosensitive thin film is formed and then exposed to light and developed to be processed into a desired shape.

As light used for light exposure in a photolithography method, for example, an i-line (a wavelength of 365 nm), a g-line (a wavelength of 436 nm), an h-line (a wavelength of 405 nm), and light in which these lines are mixed can be given. Besides, ultraviolet light, KrF laser light, ArF laser light, or the like can be used. Furthermore, exposure may be performed by liquid immersion light exposure technique. Examples of light used for light exposure include extreme ultraviolet (EUV) light and X-rays. Furthermore, instead of the light used for the exposure, an electron beam can also be used. It is preferable to use extreme ultra-violet light, X-rays, or an electron beam because extremely minute processing can be performed. Note that when exposure is performed by scanning of a beam such as an electron beam, a photomask is unnecessary.

For etching of the thin films, a dry etching method, a wet etching method, a sandblast method, or the like can be used.

[Metal Oxide]

For a semiconductor layer of the transistor included in the display apparatus of this embodiment, a metal oxide functioning as an oxide semiconductor is preferably used. A metal oxide that can be used for the semiconductor layer will be described below.

The metal oxide preferably contains at least indium or zinc. It is particularly preferable that indium and zinc are contained. Furthermore, aluminum, gallium, yttrium, tin, or the like is preferably contained in addition to them. Furthermore, one or a plurality of kinds selected from boron, titanium, iron, nickel, germanium, zirconium, molybdenum, lanthanum, cerium, neodymium, hafnium, tantalum, tungsten, magnesium, and the like may be contained.

Here, the case where the metal oxide is an In-M-Zn oxide containing indium, an element M, and zinc is considered. Note that the element M is aluminum, gallium, yttrium, tin, or the like. Examples of other elements that can be used as the element M include boron, titanium, iron, nickel, germanium, zirconium, molybdenum, lanthanum, cerium, neodymium, hafnium, tantalum, tungsten, and magnesium. Note that it is sometimes acceptable to use a plurality of the above-described elements in combination as the element M.

Note that in this specification and the like, a metal oxide containing nitrogen is also collectively referred to as a metal oxide in some cases. Alternatively, a metal oxide containing nitrogen may be referred to as a metal oxynitride. For example, a metal oxide containing nitrogen, such as zinc oxynitride (ZnON), may be used for the semiconductor layer.

Oxide semiconductors (metal oxides) can be classified into a single crystal oxide semiconductor and a non-single-crystal oxide semiconductor. Examples of a non-single-crystal oxide semiconductor include a c-axis aligned crystalline oxide semiconductor (CAAC-OS), a polycrystalline oxide semiconductor, a nanocrystalline oxide semiconductor (nc-OS), an amorphous-like oxide semiconductor (a-like OS), and an amorphous oxide semiconductor.

The CAAC-OS has c-axis alignment, a plurality of nanocrystals are connected in the a-b plane direction, and its crystal structure has distortion. Note that the distortion refers to a portion where the direction of a lattice arrangement changes between a region with a regular lattice arrangement and another region with a regular lattice arrangement in a region where the plurality of nanocrystals are connected.

The nanocrystal is basically a hexagon but is not always a regular hexagon and is a non-regular hexagon in some cases. Furthermore, a pentagonal or heptagonal lattice arrangement, for example, is included in the distortion in some cases. Note that it is difficult to observe a clear crystal grain boundary (also referred to as grain boundary) even in the vicinity of distortion in the CAAC-OS. That is, formation of a crystal grain boundary is inhibited by the distortion of a lattice arrangement. This is because the CAAC-OS can tolerate distortion owing to a low density of arrangement of oxygen atoms in the a-b plane direction, an interatomic bond length changed by substitution of a metal element, and the like.

Furthermore, the CAAC-OS tends to have a layered crystal structure (also referred to as a layered structure) in which a layer containing indium and oxygen (hereinafter, In layer) and a layer containing the element M zinc, and oxygen (hereinafter, (M,Zn) layer) are stacked. Note that indium and the element M can be replaced with each other, and when the element M in the (M,Zn) layer is replaced with indium, the layer can also be referred to as an (In,M,Zn) layer. Furthermore, when indium in the In layer is replaced with the element M, the layer can be referred to as an (In,M) layer.

The CAAC-OS is a metal oxide with high crystallinity. By contrast, in the CAAC-OS, a reduction in electron mobility due to the crystal grain boundary is less likely to occur because it is difficult to observe a clear crystal grain boundary. Entry of impurities, formation of defects, or the like might decrease the crystallinity of a metal oxide; thus, it can be said that the CAAC-OS is a metal oxide that has small amounts of impurities and defects (e.g., oxygen vacancies (also referred to as Vo)). Thus, a metal oxide including a CAAC-OS is physically stable. Therefore, the metal oxide including a CAAC-OS is resistant to heat and has high reliability.

In the nc-OS, a microscopic region (for example, a region with a size greater than or equal to 1 nm and less than or equal to 10 nm, in particular, a region with a size greater than or equal to 1 nm and less than or equal to 3 nm) has a periodic atomic arrangement. Furthermore, there is no regularity of crystal orientation between different nanocrystals in the nc-OS. Thus, the orientation in the whole film is not observed. Accordingly, the nc-OS cannot be distinguished from an a-like OS or an amorphous oxide semiconductor depending on the analysis method.

Note that indium-gallium-zinc oxide (hereinafter referred to as IGZO) that is a kind of metal oxide containing indium, gallium, and zinc has a stable structure in some cases by being formed of the above-described nanocrystals. In particular, crystals of IGZO tend not to grow in the air and thus, a stable structure is obtained when IGZO is formed of smaller crystals (e.g., the above-described nanocrystals) rather than larger crystals (here, crystals with a size of several millimeters or several centimeters).

An a-like OS is a metal oxide having a structure between those of the nc-OS and an amorphous oxide semiconductor. The a-like OS includes a void or a low-density region. That is, the a-like OS has low crystallinity as compared with the nc-OS and the CAAC-OS.

An oxide semiconductor (metal oxide) can have various structures with different properties. Two or more of the amorphous oxide semiconductor, the polycrystalline oxide semiconductor, the a-like OS, the nc-OS, and the CAAC-OS may be included in an oxide semiconductor of one embodiment of the present invention.

A metal oxide film that functions as a semiconductor layer can be formed using either or both of an inert gas and an oxygen gas. Note that there is no particular limitation on the flow rate ratio of oxygen (the partial pressure of oxygen) at the time of forming the metal oxide film. However, to obtain a transistor having high field-effect mobility, the flow rate ratio of oxygen (the partial pressure of oxygen) at the time of forming the metal oxide film is preferably higher than or equal to 0% and lower than or equal to 30%, further preferably higher than or equal to 5% and lower than or equal to 30%, still further preferably higher than or equal to 7% and lower than or equal to 15%.

The band gap of the metal oxide is preferably 2 eV or more, further preferably 2.5 eV or more, still further preferably 3 eV or more. With the use of a metal oxide having such a wide band gap, the off-state current of the transistor can be reduced.

The metal oxide film can be formed by a sputtering method. Alternatively, a PLD method, a PECVD method, a thermal CVD method, an ALD method, a vacuum evaporation method, or the like may be used.

As described above, the display apparatus of one embodiment of the present invention includes, in the pixel, two capacitors that transmit visible light and overlap with each other; therefore, the pixel can achieve both a high aperture ratio and high storage capacity.

This embodiment can be combined with the other embodiments as appropriate.

EMBODIMENT 3

In this embodiment, the composition of a CAC (Cloud-Aligned Composite)-OS that can be used for a transistor disclosed in one embodiment of the present invention will be described.

The CAC-OS is, for example, a composition of a material in which elements that constitute an oxide semiconductor are unevenly distributed to have a size of greater than or equal to 0.5 nm and less than or equal to 10 nm, preferably greater than or equal to 1 nm and less than or equal to 2 nm, or a similar size. Note that in the following description, a state in which one or more metal elements are unevenly distributed and regions including the metal element(s) are mixed to have a size of greater than or equal to 0.5 nm and less than or equal to 10 nm, preferably greater than or equal to 1 nm and less than or equal to 2 nm, or a similar size in an oxide semiconductor is referred to as a mosaic pattern or a patch-like pattern.

Note that an oxide semiconductor preferably contains at least indium. In particular, indium and zinc are preferably contained. In addition, one or more of aluminum, gallium, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like may be contained.

For example, CAC-OS in an In-Ga—Zn oxide (of the CAC-OS, an In-Ga—Zn oxide may be particularly referred to as CAC-IGZO) has a composition (hereinafter, referred to as cloud-like composition) in which materials are separated into indium oxide (hereinafter, $InO_{X1}$ (X1 is a real number greater than 0)) or indium zinc oxide (hereinafter, $In_{X2}Zn_{Y2}O_{Z2}$ (X2, Y2, and Z2 are real numbers greater than 0)), and gallium oxide (hereinafter, $GaO_{X3}$ (X3 is a real number greater than 0)) or gallium zinc oxide (hereinafter, $Ga_{X4}Zn_{Y4}O_{Z4}$ (X4, Y4, and Z4 are real numbers greater than 0)) to form a mosaic pattern, and $InO_{X1}$ or $In_{X2}Zn_{Y2}O_{Z2}$ forming the mosaic pattern is evenly distributed in the film.

That is, the CAC-OS is a composite oxide semiconductor with a composition in which a region containing $GaO_{X3}$ as a main component and a region containing $In_{X2}Zn_{Y2}O_{Z2}$ or $InO_{X1}$ as a main component are mixed. Note that in this specification, for example, when the atomic ratio of In to an element M in a first region is greater than the atomic ratio of In to an element M in a second region, the first region is described as having higher In concentration than the second region.

Note that IGZO is a common name, which may specify a compound containing In, Ga, Zn, and O. Typical examples of IGZO include a crystalline compound represented by $InGaO_3(ZnO)_{m1}$ (m1 is a natural number) and a crystalline compound represented by $In_{(1+x0)}Ga_{(1-x0)}O_3(ZnO)_{m0}$ ($-1 \leq x0 \leq 1$; m0 is a given number).

The above crystalline compounds have a single crystal structure, a polycrystalline structure, or a CAAC structure. Note that the CAAC structure is a crystal structure in which a plurality of IGZO nanocrystals have c-axis alignment and are connected in the a-b plane direction without alignment.

The CAC-OS relates to the material composition of an oxide semiconductor. In the material composition of a CAC-OS containing In, Ga, Zn, and O, some regions that contain Ga as a main component and are observed as nanoparticles and some regions that contain In as a main component and are observed as nanoparticles are each randomly dispersed in a mosaic pattern. Therefore, the crystal structure is a secondary element for the CAC-OS.

Note that in the CAC-OS, a layered structure including two or more films with different compositions is not included. For example, a two-layer structure of a film containing In as a main component and a film containing Ga as a main component is not included.

A boundary between the region containing $GaO_{X3}$ as a main component and the region containing $In_{X2}Zn_{Y2}O_{X2}$ or $InO_{X1}$ as a main component is not clearly observed in some cases.

In the case where one or more kinds selected from aluminum, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like are contained instead of gallium, the CAC-OS refers to a composition in which some regions that contain the metal element(s) as a main component and are observed as nanoparticles and some regions that contain In as a main component and are observed as nanoparticles are each randomly dispersed in a mosaic pattern.

The CAC-OS can be formed by a sputtering method under a condition where a substrate is not heated intentionally, for example. In the case where the CAC-OS is formed by a sputtering method, one or more selected from an inert gas (typically, argon), an oxygen gas, and a nitrogen gas may be used as a deposition gas. The flow rate of the oxygen gas to the total flow rate of the deposition gas in deposition is preferably as low as possible, for example, the flow rate of the oxygen gas is higher than or equal to 0% and lower than 30%, preferably higher than or equal to 0% and lower than or equal to 10%.

The CAC-OS is characterized in that a clear peak is not observed when measurement is conducted using a θ/2θ scan by an Out-of-plane method, which is an X-ray diffraction (XRD) measurement method. That is, it is found by the X-ray diffraction measurement that there are no alignment in the a-b plane direction and the c-axis direction in the measured areas.

In the CAC-OS, an electron diffraction pattern that is obtained by irradiation with an electron beam with a probe diameter of 1 nm (also referred to as nanobeam electron beam) has a region with high luminance in a ring pattern (a ring region) and a plurality of bright spots observed in the ring region. It is therefore found from the electron diffraction pattern that the crystal structure of the CAC-OS includes an nc (nano-crystal) structure with no alignment in the plan-view direction and the cross-sectional direction.

Moreover, for example, it can be confirmed by EDX mapping obtained using energy dispersive X-ray spectroscopy (EDX) that the CAC-OS in the In-Ga—Zn oxide has a composition in which regions containing $GaO_{X3}$ as a main component and regions containing $In_{X2}Zn_{Y2}O_{Z2}$ or $InO_{X1}$ as a main component are unevenly distributed and mixed.

The CAC-OS has a structure different from that of an IGZO compound in which metal elements are evenly distributed, and has characteristics different from those of the IGZO compound. That is, the CAC-OS has a composition in which regions where $GaO_{X3}$ or the like is a main component and regions where $In_{X2}Zn_{Y2}O_{Z2}$ or $InO_{X1}$ is a main component are phase-separated from each other, and the regions including the respective elements as the main components form a mosaic pattern.

The conductivity of a region containing $In_{x2}Zn_{y2}O_{Z2}$ or $InO_{X1}$ as a main component is higher than that of a region containing $GaO_{X3}$ or the like as a main component. In other words, when carriers flow through regions containing $In_{x2}Zn_{y2}O_{Z2}$ or $InO_{X1}$ as a main component, the conductivity of an oxide semiconductor is generated. Accordingly, when the regions including $In_{x2}Zn_{y2}O_{Z2}$ or $InO_{X1}$ as a main component are distributed in an oxide semiconductor like a cloud, high field-effect mobility (μ) can be achieved.

In contrast, a region containing $GaO_{X3}$ or the like as a main component is a region whose insulating property is higher than that of a region containing $In_{x2}Zn_{y2}O_{Z2}$ or $InO_{X1}$ as a main component. In other words, when regions containing $GaO_{X3}$ or the like as a main component are distributed in an oxide semiconductor, leakage current can be suppressed and favorable switching operation can be achieved.

Accordingly, when a CAC-OS is used in a semiconductor element, the insulating property derived from $GaO_{X3}$ or the like and the conductivity derived from $In_{x2}Zn_{y2}O_{Z2}$ or $InO_{X1}$ complement each other, whereby high on-state current ($I_{on}$) and high field-effect mobility (μ) can be achieved.

A semiconductor element using a CAC-OS has high reliability. Thus, the CAC-OS is most suitable for a variety of semiconductor devices typified by a display.

This embodiment can be combined with the other embodiments as appropriate.

EMBODIMENT 4

In this embodiment, electronic devices of embodiments of the present invention will be described with reference to FIG. 15 and FIG. 16.

An electronic device in this embodiment includes, in a display portion, a display apparatus of one embodiment of the present invention. Therefore, a display portion of each of the electronic devices can display a high-quality image.

The display portion of the electronic device in this embodiment can display an image with a resolution of, for example, full high definition, 2K, 4K, 8K, 16K, or higher. In addition, as a screen size of the display portion, the diagonal size can be greater than or equal to 20 inches, greater than or equal to 30 inches, greater than or equal to 50 inches, greater than or equal to 60 inches, or greater than or equal to 70 inches.

Examples of the electronic devices in which the display system of one embodiment of the present invention can be used include a digital camera, a digital video camera, a digital photo frame, a mobile phone, a portable game console, a portable information terminal, and an audio reproducing device, in addition to electronic devices with a relatively large screen, such as a television device, a desktop or notebook personal computer, a monitor for a computer or the like, digital signage, and a large game machine or the like such as a pachinko machine. Furthermore, the display apparatus of one embodiment of the present invention can be suitably used in portable electronic devices, wearable electronic devices (wearable devices), VR (Virtual Reality) devices, AR (Augmented Reality) devices, and the like.

The electronic device of one embodiment of the present invention may include a secondary battery, and it is preferable that the secondary battery be capable of being charged by contactless power transmission.

Examples of the secondary battery include a lithium ion secondary battery such as a lithium polymer battery using a gel electrolyte (lithium ion polymer battery), a nickel-hydride battery, a nickel-cadmium battery, an organic radical battery, a lead-acid battery, an air secondary battery, a nickel-zinc battery, and a silver-zinc battery.

The electronic device of one embodiment of the present invention may include an antenna. When a signal is received by the antenna, the electronic device can display a video, data, or the like on the display portion. When the electronic device includes the antenna and a secondary battery, the antenna may be used for contactless power transmission.

The electronic device of one embodiment of the present invention may include a sensor (a sensor having a function of measuring force, displacement, position, speed, acceleration, angular velocity, rotational frequency, distance, light, liquid, magnetism, temperature, a chemical substance, sound, time, hardness, electric field, current, voltage, electric power, radioactive rays, flow rate, humidity, gradient, oscillation, a smell, or infrared rays).

The electronic device of one embodiment of the present invention can have a variety of functions. For example, the electronic device can have a function of displaying a variety of data (a still image, a moving image, a text image, and the like) on the display portion, a touch panel function, a function of displaying a calendar, date, time, and the like, a function of executing a variety of software (programs), a wireless communication function, and a function of reading out a program or data stored in a recording medium.

Furthermore, an electronic device including a plurality of display portions can have a function of displaying image data mainly on one display portion while displaying text data mainly on another display portion, a function of displaying a three-dimensional image by displaying images on a plurality of display portions with a parallax taken into account, or the like. Furthermore, an electronic device including an image receiving portion can have a function of taking a still image or a moving image, a function of automatically or manually correcting a taken image, a function of storing a taken image in a recording medium (an external recording medium or a recording medium incorporated in the electronic device), a function of displaying a taken image on a display portion, or the like. Note that functions of the electronic device of one embodiment of the present invention are not limited thereto, and the electronic devices can have a variety of functions.

Figure 15A:
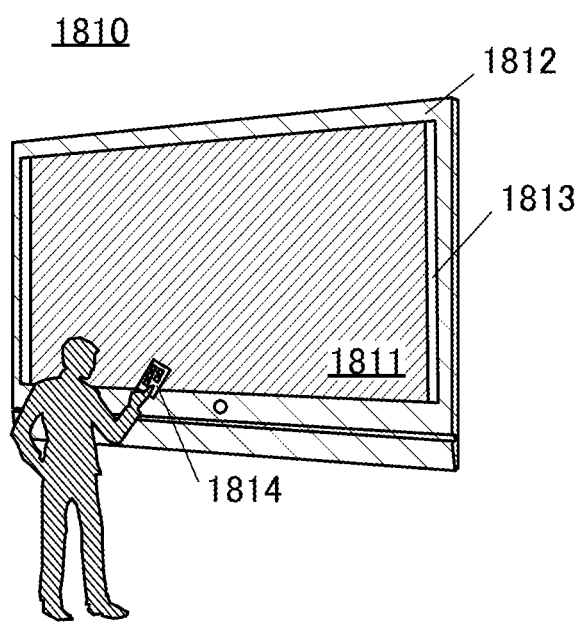
FIG. 15A-15C are diagrams each illustrating an example of an electronic device.

FIG. 15(A) illustrates a television device 1810. The television device 1810 includes a display portion 1811, a housing 1812, a speaker 1813, and the like. Furthermore, the television device can include an LED lamp, operation keys (including a power switch or an operation switch), a connection terminal, a variety of sensors, a microphone, and the like.

The television device 1810 can be controlled with a remote controller 1814.

As airwaves the television device 1810 can receive, ground waves, waves transmitted from a satellite, and the like can be given. The example of the airwaves also include analog broadcasting, digital broadcasting, image-sound-only broadcasting, and sound-only broadcasting. For example, the television device 1810 can receive airwaves transmitted in a certain frequency band in a UHF band (about 300 MHz to 3 GHz) or a VHF band (30 MHz to 300 MHz). When a plurality of pieces of data received in a plurality of frequency bands is used, the transfer rate can be increased and more information can be obtained. Accordingly, the display portion 1811 can display an image with a resolution higher than the full high definition. For example, an image with a resolution of 4K, 8K, 16K, or higher can be displayed.

A structure may be employed in which an image to be displayed on the display portion 1811 is generated using broadcasting data transmitted with a technology for transmitting data via a computer network such as the Internet, a LAN (Local Area Network), or Wi-Fi (registered trademark). In that case, the television device 1810 does not necessarily include a tuner.

Figure 15B:
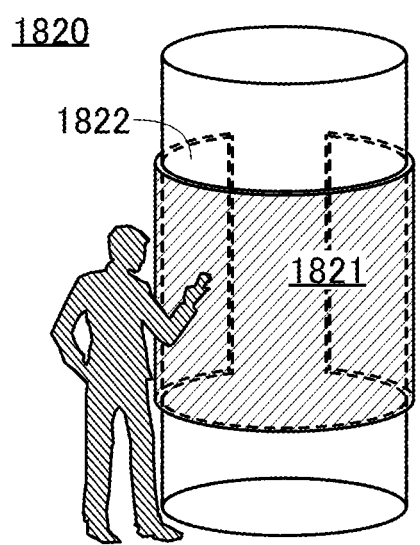

FIG. 15(B) illustrates a digital signage 1820 mounted on a cylindrical pillar 1822. The digital signage 1820 includes a display portion 1821.

The larger the display portion 1821 is, the more amount of information can be provided at a time. In addition, the larger the display portion 1821 is, the more it attracts attention, so that the effectiveness of the advertisement can be increased, for example.

It is preferable to use a touch panel in the display portion 1821 because not only a still image or a moving image is displayed on the display portion 1821 but also users can operate intuitively. Moreover, for an application for providing information such as route information or traffic information, usability can be enhanced by intuitive operation.

Figure 15C:
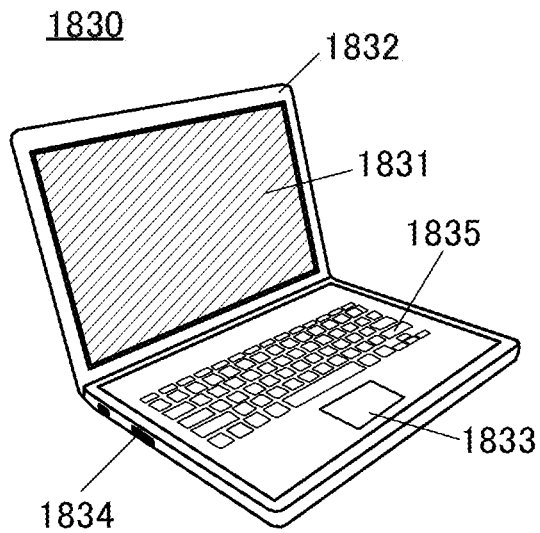

FIG. 15(C) illustrates a notebook personal computer 1830. The personal computer 1830 includes a display portion 1831, a housing 1832, a touch pad 1833, a connection port 1834, and the like.

The touch pad 1833 functions as an input means such as a pointing device or a pen tablet and can be controlled with a finger, a stylus, or the like.

Furthermore, a display device is incorporated in the touch pad 1833. As illustrated in FIG. 15(C), when input keys 1835 are displayed on a surface of the touch pad 1833, the touch pad 1833 can be used as a keyboard. In that case, a vibration module may be incorporated in the touch pad 1833 so that sense of touch is achieved by vibration when the input keys 1835 are touched.

Figure 16A:
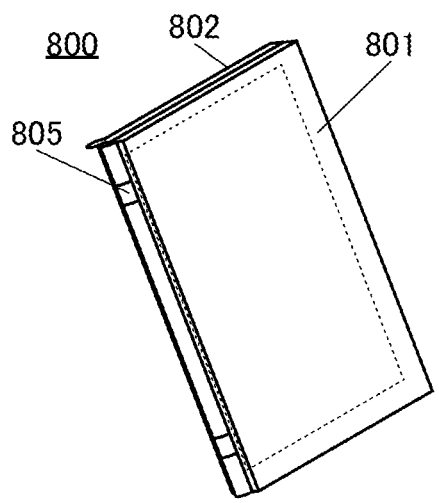
FIGS. 16A-16E are diagrams illustrating examples of an electronic device.
Figure 16B:
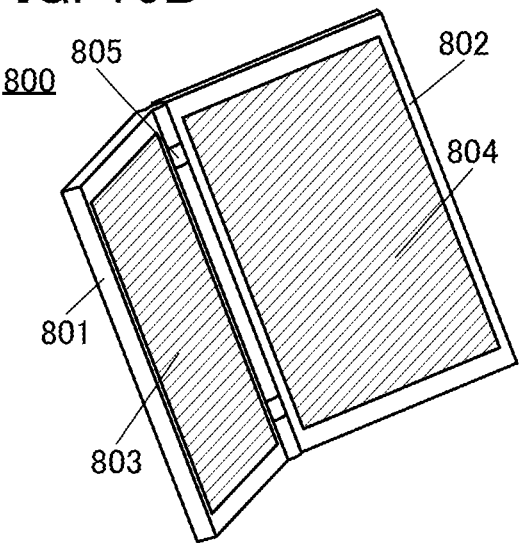

FIGS. 16(A) and 16(B) illustrate a portable information terminal 800. The portable information terminal 800 includes a housing 801, a housing 802, a display portion 803, a display portion 804, a hinge 805, and the like.

The housing 801 and the housing 802 are joined together with the hinge 805. As for the portable information terminal 800, the housing 801 and the housing 802 can be opened as illustrated in FIG. 16(B) from a folded state illustrated in FIG. 16(A).

For example, text information can be displayed on the display portion 803 and the display portion 804; thus, the portable information terminal can be used as an e-book reader. Furthermore, still images and moving images can be displayed on the display portion 803 and the display portion 804.

The portable information terminal 800 can be in a folded state when being carried, and thus is highly versatile.

Note that the housing 801 and the housing 802 may have a power button, an operation button, an external connection port, a speaker, a microphone, and the like.

Figure 16C:
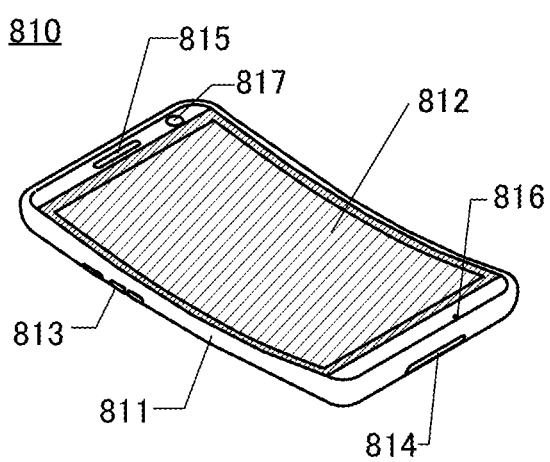

FIG. 16(C) illustrates an example of a portable information terminal. A portable information terminal 810 illustrated in FIG. 16(C) includes a housing 811, a display portion 812, operation buttons 813, an external connection port 814, a speaker 815, a microphone 816, a camera 817, and the like.

The portable information terminal 810 includes a touch sensor in the display portion 812. Operations such as making a call and inputting text can be performed by touching the display portion 812 with a finger, a stylus, or the like.

By an operation with the operation buttons 813, power on/off operations and types of images displayed on the display portion 812 can be switched. For example, switching from a mail creation screen to a main menu screen can be performed.

When a detection device such as a gyroscope sensor or an acceleration sensor is provided inside the portable information terminal 810, the direction of display on the screen of the display portion 812 can be automatically changed by determining the orientation (horizontal or vertical) of the portable information terminal 810. Furthermore, the direction of display on the screen can be changed by touch on the display portion 812, operation with the operation button 813, sound input using the microphone 816, or the like.

The portable information terminal 810 has a function of, for example, one or more selected from a telephone set, a notebook, an information browsing device, and the like. Specifically, the portable information terminal can be used as a smartphone. The portable information terminal 810 is capable of executing a variety of applications such as mobile phone calls, e-mailing, text viewing and writing, music replay, video replay, Internet communication, and games, for example.

Figure 16D:
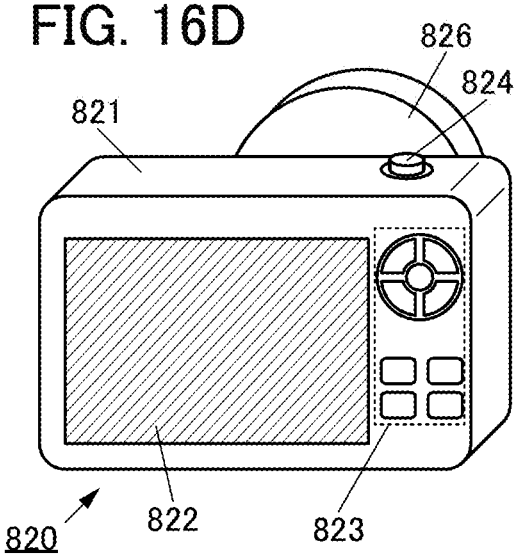

FIG. 16(D) illustrates an example of a camera. A camera 820 includes a housing 821, a display portion 822, operation buttons 823, a shutter button 824, and the like. Furthermore, a detachable lens 826 is attached to the camera 820.

Although the lens 826 of the camera 820 here is detachable from the housing 821 for replacement, the lens 826 may be integrated with the housing.

A still image or a moving image can be taken with the camera 820 at the press of the shutter button 824. In addition, the display portion 822 has a function of a touch panel, and images can also be taken by the touch on the display portion 822.

Note that a stroboscope, a viewfinder, or the like can be additionally attached to the camera 820. Alternatively, these may be incorporated into the housing 821.

Figure 16E:
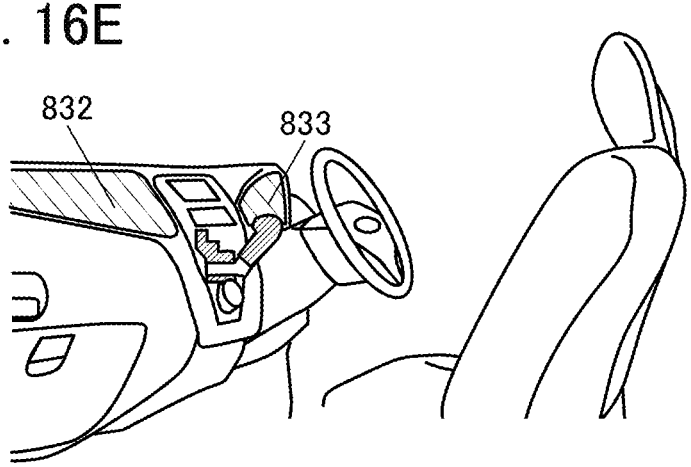

FIG. 16(E) illustrates an example in which the display apparatus of one embodiment of the present invention is used as an in-vehicle display. A display portion 832 and a display portion 833 can provide a variety of kinds of information by displaying navigation information, a speedometer, a tachometer, a mileage, a fuel meter, a gearshift state, air-condition setting, and the like.

As described above, electronic devices can be obtained by application of the display apparatus of one embodiment of the present invention. The display apparatus has a remarkably wide application range, and can be used in electronic devices in a variety of fields.

This embodiment can be combined with the other embodiments as appropriate.

EXAMPLE

In this example, results of simulation performed on the display apparatus of one embodiment of the present invention will be described.

In this example, simulation was performed on the pixel 11 having the structure illustrated in FIG. 1(B). FIG. 17(A) is a diagram showing an operation method of the pixel 11 subjected to the simulation in this example, and operations in a period T51 to a period T54 are separately described. FIGS. 17(B1), 17(B2), 17(B3), and 17(B4) are circuit diagrams showing specific operation methods of the pixel 11 in the periods shown in FIG. 17(A). Specifically, FIG. 17(B1), FIG. 17(B2), FIG. 17(B3), and FIG. 17(B4) are circuit diagrams showing specific operation methods of the pixel 11 in the period T51, the period T52, the period T53, and the period T54, respectively.

In the period T51, image data and data were written to the pixel 11. Specifically, a potential of 24 V was supplied as a high potential to the wiring 21 and the wiring 22, so that the transistor 41 and the transistor 42 were turned on. In addition, the potential of the wiring 31 was set to the potential $V_{ID}$, i.e., a potential corresponding to the image data, and the potential of the wiring 32 was set to the potential $V_{data}$, i.e., a potential corresponding to the data.

The writing of the image data and the data to the pixel 11 was completed in the period T52, followed by a waiting time. Specifically, a potential of −8 V was supplied as a low potential to the wiring 21 and the wiring 22, so that the transistor 41 and the transistor 42 were turned off.

In the period T53, new image data was generated in the pixel 11 on the basis of the image data and the data that had been written to the pixel 11 in the period T51. Specifically, a potential of −8 V was supplied as a low potential to the wiring 21 to turn off the transistor 41, and a potential of 24 V was supplied as a high potential to the wiring 22 to turn on the transistor 42. The potential of the wiring 32 was set to $V_{ref}$.

In the period T54, the generation of the new image data in the pixel 11 was completed, followed by a waiting time. Specifically, a potential of −8 V was supplied as a low potential to the wiring 21 and the wiring 22 to turn off the transistor 41 and the transistor 42.

Here, the potential $V_{data}$ supplied to the wiring 32 in the period T51 was set to a potential calculated by the following formula. Note that the display device 60 was a liquid crystal device, the capacitance of the capacitor 51 was 1 pF, the capacitance of the capacitor 52 was 10 pF, and the capacitance of the display device 60 was 1 pF. That is, $C_1$ was 2 pF and $C_2$ was 10 pF. In the following formula, a potential VD represents a target value of the potential of the node NM1 in the period T53 and the period T54. In this example, whether or not the potential of the node NM1 becomes the potential VD in the period T53 and the period T54 was confirmed by the simulation.

[Formula 5]

$$V_{data} = V_{ref} - \frac{C_1 + C_2}{C_2}(V_D - V_{ID}) \quad (5)$$

Note that in the period T51 to the period T54, the potential of the wiring 61 and the potential of the wiring 62 were each set to a ground potential.

Figure 18A:
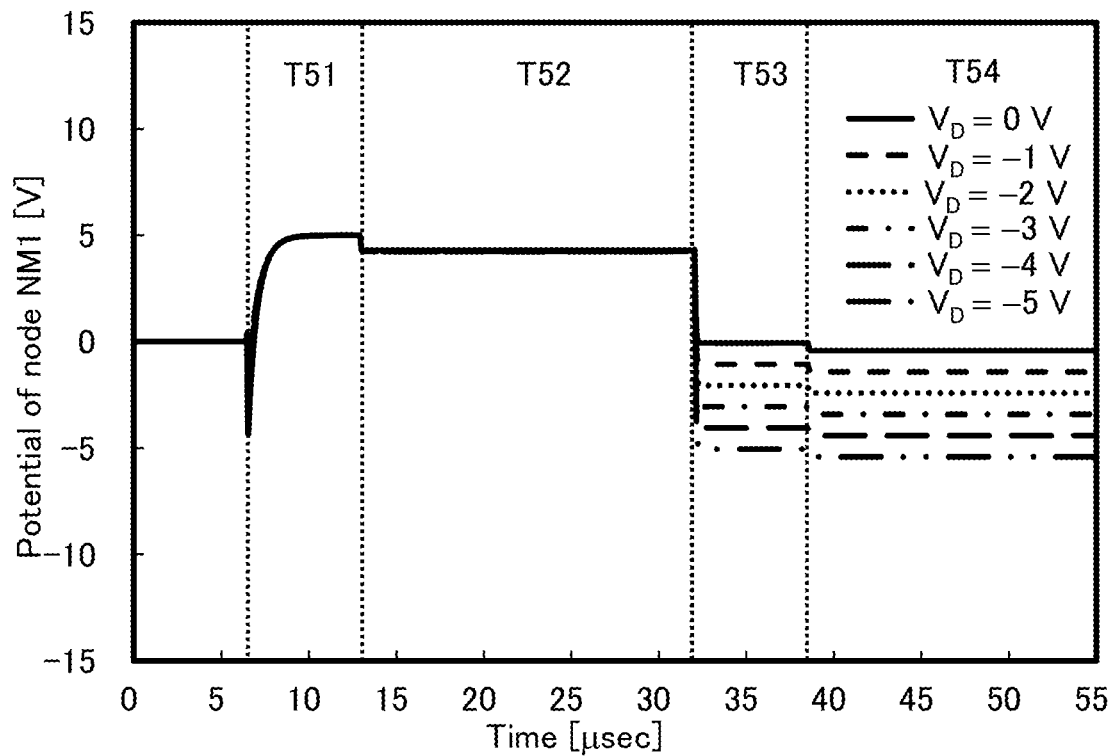
FIGS. 18A and 18B are diagrams showing simulation results.
Figure 18B:
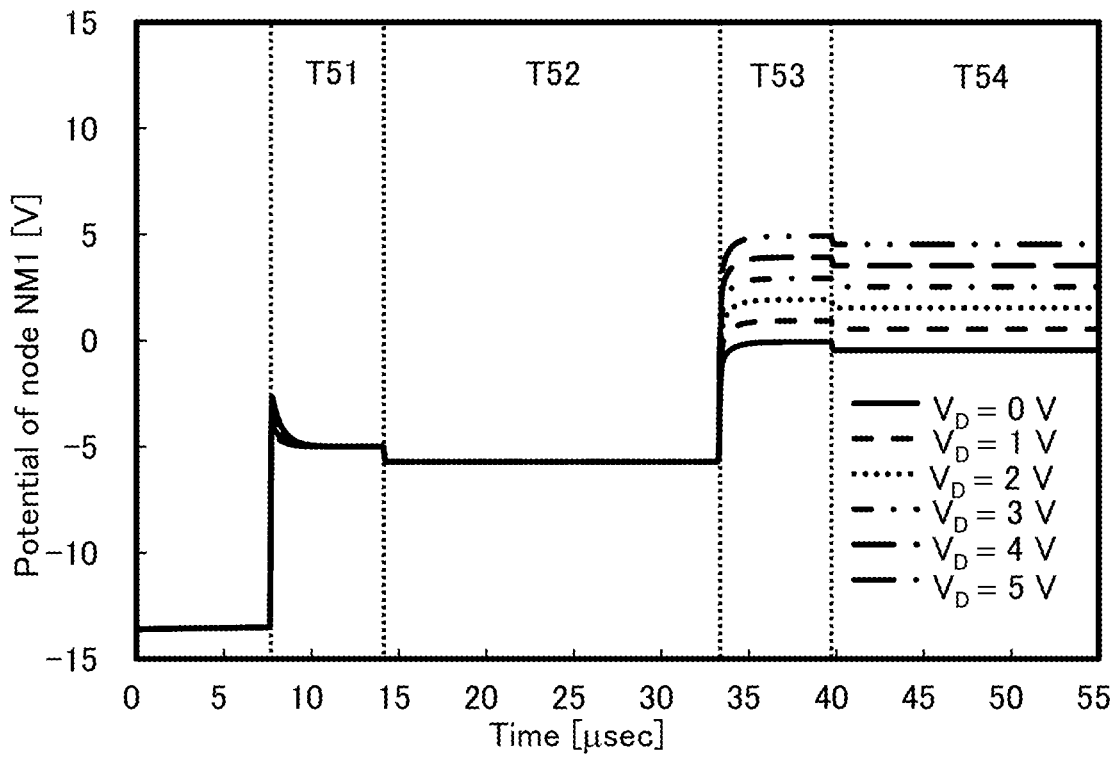

FIG. 18(A) shows the simulation results of the potential of the node NM1 in the period T51 to the period T54 in the case where the potential VD was set to 0 V, −1 V, −2 V, −3 V, −4 V, and −5 V. FIG. 18(B) shows the simulation results of the potential of the node NM1 in the period T51 to the period T54 in the case where the potential VD was set to 0 V, 1 V, 2 V, 3 V, 4 V, and 5 V. In the case shown in FIG. 18(A), the potential $V_{ID}$ was 5 V and the potential $V_{ref}$ was −12 V, and in the case shown in FIG. 18(B), the potential $V_{ID}$ was −5 V and the potential $V_{ref}$ was 12 V. In other words, in the case shown in FIG. 18(A), the potential VD was positive and the potential VD was 0 or negative, whereas in the case shown in FIG. 18(B), the potential $V_{ID}$ was negative and the potential VD was 0 or positive.

It was found from FIGS. 18(A) and 18(B) that the potential of the node NM1 became the target value, the potential VD, in the period T53 and the period T54.

REFERENCE NUMERALS

10: display apparatus, 11: pixel, 12: display portion, 13: gate driver, 14: source driver, 15: memory circuit, 16: memory circuit, 21: wiring, 22: wiring, 23: wiring, 30: backlight unit, 31: wiring, 32: wiring, 33: wiring, 38: light-blocking layer, 39: light source, 41: transistor, 42: transistor, 43: transistor, 44: insulating layer, 45: insulating layer, 46: conductive layer, 46*a*: conductive layer, 46*b*: conductive layer, 51: capacitor, 52: capacitor, 53: capacitor, 60: display device, 61: wiring, 62: wiring, 73: connection portion, 74: connection portion, 110: display apparatus, 111: pixel, 112: display portion, 113: gate driver, 114: source driver, 121: pixel electrode, 122: liquid crystal layer, 123: common electrode, 123*a*: common electrode, 123*b*: conductive layer, 131: substrate, 132: substrate, 133*a*: alignment film, 133*b*: alignment film, 135: overcoat, 141: adhesive layer, 161: polarizing plate, 163: polarizing plate, 172: FPC, 211: gate insulating layer, 212: insulating layer, 213: insulating layer, 214: insulating layer, 215: insulating layer, 217: insulating layer, 218: insulating layer, 221: gate, 221*a*: gate, 221*b*: gate, 222*a*: conductive layer, 222*b*: conductive layer, 222*c*: conductive layer, 222*d*: conductive layer, 222*e*: conductive layer, 223: gate, 223*a*: gate, 223*b*: gate, 225: gate insulating layer, 225*a*: gate insulating layer, 225*b*: gate insulating layer, 231: semiconductor layer, 231*a*: semiconductor layer, 231*b*: semiconductor layer, 242: connector, 800: portable information terminal, 801: housing, 802: housing, 803: display portion, 804: display portion, 805: hinge, 810: portable information terminal, 811: housing, 812: display portion, 813: operation button, 814: external connection port, 815: speaker, 816: microphone, 817: camera, 820: camera, 821: housing, 822: display portion, 823: operation button, 824: shutter button, 826: lens, 832: display portion, 833: display portion, 1810: television device, 1811: display portion, 1812: housing, 1813: speaker, 1814: remote controller, 1820: digital signage, 1821: display portion, 1822: pillar, 1830: personal computer, 1831: display portion, 1832: housing, 1833: touch pad, 1834: connection port, 1835: input key This application is based on Japanese Patent Application Serial No. 2018-030259 filed with Japan Patent Office on Feb. 23, 2018, the entire contents of which are hereby incorporated herein by reference.

The invention claimed is:

1. An operation method of a display apparatus comprising a display portion provided with a pixel,
   wherein the display portion is configured to display a first-color image and a second-color image,
   the operation method comprising:
   a first period in which first image data and first data are written to the pixel;
   a second period in which the first-color image corresponding to the first image data is displayed on the display portion;
   a third period in which second image data is generated in the pixel on the basis of the first image data and the first data; and
   a fourth period in which the second-color image corresponding to the second image data is displayed on the display portion, wherein a reference potential is supplied to the pixel in the third period to generate the second image data in the pixel on the basis of the first image data and the first data.

2. The operation method of the display apparatus according to claim 1,
wherein the third period is shorter than the first period.

3. The operation method of the display apparatus according to claim 1,
wherein the display apparatus comprises a source driver,
wherein the source driver is electrically connected to the pixel through a first data line,
wherein the source driver is electrically connected to the pixel through a second data line,
wherein the source driver is configured to generate the first image data and the first data, and
wherein in the first period, the first image data is written to the pixel through the first data line and the first data is written to the pixel through the second data line.

4. An operation method of a display apparatus comprising a display portion provided with a pixel,
wherein the display portion is configured to display a first-color image, a second-color image, and a third-color image,
the operation method comprising:
a first period in which first image data and first data are written to the pixel;
a second period in which the first-color image corresponding to the first image data is displayed on the display portion;
a third period in which second image data is generated in the pixel on the basis of the first image data and the first data;
a fourth period in which the second-color image corresponding to the second image data is displayed on the display portion;
a fifth period in which third image data and second data are written to the pixel;
a sixth period in which the third-color image corresponding to the third image data is displayed on the display portion;
a seventh period in which fourth image data is generated in the pixel on the basis of the third image data and the second data;
an eighth period in which the first-color image corresponding to the fourth image data is displayed on the display portion;
a ninth period in which fifth image data and third data are written to the pixel;
a tenth period in which the second-color image corresponding to the fifth image data is displayed on the display portion;
an eleventh period in which sixth image data is generated in the pixel on the basis of the fifth image data and the third data; and
a twelfth period in which the third-color image corresponding to the sixth image data is displayed on the display portion.

5. The operation method of the display apparatus according to claim 4,
wherein a reference potential is supplied to the pixel in the third period to generate the second image data in the pixel on the basis of the first image data and the first data,
wherein the reference potential is supplied to the pixel in the seventh period to generate the fourth image data in the pixel on the basis of the third image data and the second data, and
wherein the reference potential is supplied to the pixel in the eleventh period to generate the sixth image data in the pixel on the basis of the fifth image data and the third data.

6. The operation method of the display apparatus according to claim 4,
wherein the third period, the seventh period, and the eleventh period are shorter than the first period, the fifth period, and the ninth period.

7. The operation method of the display apparatus according to claim 4,
wherein the display apparatus comprises a source driver,
wherein the source driver is electrically connected to the pixel through a first data line,
wherein the source driver is electrically connected to the pixel through a second data line,
wherein the source driver has a function of generating the first image data, the third image data, and the fifth image data and the first to third data,
wherein in the first period, the first image data is written to the pixel through the first data line and the first data is written to the pixel through the second data line,
wherein in the fifth period, the third image data is written to the pixel through the first data line and the second data is written to the pixel through the second data line, and
wherein in the ninth period, the fifth image data is written to the pixel through the first data line and the third data is written to the pixel through the second data line.

8. The operation method of the display apparatus according to claim 3,
wherein the pixel comprises a memory circuit and a display device, and
wherein the memory circuit is electrically connected to the first data line and the second data line.

9. The operation method of the display apparatus according to claim 8,
wherein the memory circuit comprises a first transistor, a second transistor, and a capacitor,
wherein one of a source and a drain of the first transistor is electrically connected to one electrode of the capacitor,
wherein the other of the source and the drain of the first transistor is electrically connected to the first data line,
wherein one of a source and a drain of the second transistor is electrically connected to the other electrode of the capacitor, and
wherein the other of the source and the drain of the second transistor is electrically connected to the second data line.

10. The operation method of the display apparatus according to claim 9,
wherein the first transistor comprises a metal oxide in a channel formation region, and
wherein the metal oxide comprises In, Zn, and Ga.

11. The operation method of the display apparatus according to claim 8,
wherein the display device is a liquid crystal device.

* * * * *